US011556995B1

(12) United States Patent
Little et al.

(10) Patent No.: US 11,556,995 B1
(45) Date of Patent: Jan. 17, 2023

(54) PREDICTIVE ANALYTICS FOR ASSESSING PROPERTY USING EXTERNAL DATA

(71) Applicant: STATE FARM MUTUAL AUTOMOBILE INSURANCE COMPANY, Bloomington, IL (US)

(72) Inventors: Rebecca A. Little, Gilbert, AZ (US); Bryan R. Nussbaum, Bloomington, IL (US); Deanna L. Stockweather, Normal, IL (US); Nathan C. Summers, Mesa, AZ (US); An Ho, Phoenix, AZ (US); Vicki King, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 16/163,200

(22) Filed: Oct. 17, 2018

(51) Int. Cl.
*G06Q 40/08* (2012.01)
*G06T 17/05* (2011.01)
(Continued)

(52) U.S. Cl.
CPC .......... *G06Q 40/08* (2013.01); *B64C 39/024* (2013.01); *G06Q 50/165* (2013.01); *G06T 17/05* (2013.01); *B64C 2201/123* (2013.01)

(58) Field of Classification Search
CPC .... G06Q 40/08; G06Q 50/16; G06Q 30/0625; G06K 9/6263; G06K 9/46; G06K 9/00671; G06F 16/27
See application file for complete search history.

(56) References Cited

U.S. PATENT DOCUMENTS 6,836,270 B2 12/2004 Du
7,027,054 B1 4/2006 Cheiky et al.
(Continued)

FOREIGN PATENT DOCUMENTS

EP 0930755 A1 7/1999
WO WO-2016/040376 A1 3/2016
WO WO-2016/148753 A1 9/2016

OTHER PUBLICATIONS

Property Data Assessment—Real Estate Assessment API, https://batchleads.io/batchdata-api (Year: 2017).*
(Continued)

*Primary Examiner* — Calvin L Hewitt, II
*Assistant Examiner* — Amanulla Abdullaev
(74) *Attorney, Agent, or Firm* — Lee & Hayes, P.C.

(57) ABSTRACT

Methods and systems for assessing property based on predictive analytics techniques that use external data are described herein. A server may identify a reference set of information for a reference property evaluated with a reference risk score in accordance with a risk score rule that meets a predetermined threshold. The server may obtain an external data file from an external data source, wherein the external data file includes an external set of information for a prospective property. The server may compare the reference set of information with the external set of information to identify a common feature, condition, or attribute, and if identified, may evaluate the prospective property by determining a predicted risk score based on the external set of information in accordance with the risk score rule. If the predicted risk score is determined to meet the threshold, the server may indicate the prospective property as pre-approved.

19 Claims, 8 Drawing Sheets

(51) Int. Cl.
*B64C 39/02* (2006.01)
*G06Q 50/16* (2012.01)

(56) References Cited

U.S. PATENT DOCUMENTS

| | | | |
|---|---|---|---|
| 8,718,612 | B2 | 5/2014 | Caiman et al. |
| 8,761,811 | B2 | 6/2014 | Alonzo |
| 8,902,288 | B1 | 12/2014 | Fan et al. |
| 9,082,015 | B2 | 7/2015 | Christopulos et al. |
| 9,160,993 | B1 | 10/2015 | Lish et al. |
| 9,875,509 | B1 * | 1/2018 | Harvey .................. G06T 17/20 |
| 9,959,581 | B2 | 5/2018 | Pershing |
| 10,157,502 | B2 | 12/2018 | Montgomerie et al. |
| 10,163,271 | B1 | 12/2018 | Powers et al. |
| 10,242,501 | B1 | 3/2019 | Pusch et al. |
| 10,373,387 | B1 | 8/2019 | Fields et al. |
| 10,521,865 | B1 * | 12/2019 | Spader ................. G06K 9/0063 |
| 10,721,280 | B1 | 7/2020 | Heppner et al. |
| 2002/0196202 | A1 | 12/2002 | Bastian et al. |
| 2007/0260401 | A1 * | 11/2007 | Sydor .................... G06Q 40/08 702/1 |
| 2009/0222742 | A1 | 9/2009 | Pelton et al. |
| 2012/0156668 | A1 | 6/2012 | Zelin |
| 2012/0231814 | A1 | 9/2012 | Calman et al. |
| 2013/0215116 | A1 | 8/2013 | Siddique et al. |
| 2014/0267410 | A1 | 9/2014 | Fein et al. |
| 2014/0279572 | A1 | 9/2014 | Coats et al. |
| 2014/0279573 | A1 * | 9/2014 | Coats ................. G06Q 30/0278 705/306 |
| 2014/0280269 | A1 * | 9/2014 | Schultz ................... G06F 16/29 707/758 |
| 2014/0280644 | A1 | 9/2014 | Cronin |
| 2014/0370958 | A1 | 12/2014 | Lutnick |
| 2015/0020003 | A1 | 1/2015 | Karam |
| 2015/0025915 | A1 * | 1/2015 | Lekas .................... G06Q 40/08 705/4 |
| 2015/0206218 | A1 | 7/2015 | Banerjee et al. |
| 2016/0035140 | A1 | 2/2016 | Bickerstaff et al. |
| 2016/0048934 | A1 * | 2/2016 | Gross .................. G06K 9/4642 705/313 |
| 2016/0092959 | A1 * | 3/2016 | Gross ................. G06Q 30/0625 705/26.62 |
| 2016/0148285 | A1 | 5/2016 | Kalata |
| 2016/0267610 | A1 | 9/2016 | Corbett et al. |
| 2016/0313736 | A1 | 10/2016 | Schultz et al. |
| 2016/0314545 | A1 * | 10/2016 | Jessen .................... G06Q 50/16 |
| 2017/0032466 | A1 | 2/2017 | Feldman et al. |
| 2017/0032574 | A1 | 2/2017 | Sugaya |
| 2017/0053455 | A1 | 2/2017 | Chen et al. |
| 2017/0076408 | A1 | 3/2017 | D'Souza et al. |
| 2017/0098309 | A1 | 4/2017 | Michel |
| 2017/0108922 | A1 | 4/2017 | Terahata |
| 2017/0124396 | A1 | 5/2017 | Todeschini et al. |
| 2017/0173466 | A1 | 6/2017 | Fahmie |
| 2017/0329329 | A1 | 11/2017 | Kamhi et al. |
| 2018/0005161 | A1 * | 1/2018 | Cong ............... G06Q 10/06398 |
| 2018/0089763 | A1 * | 3/2018 | Okazaki ................... G06N 3/04 |
| 2018/0158156 | A1 * | 6/2018 | Dintenfass ......... G06K 9/00671 |
| 2018/0322702 | A1 | 11/2018 | Djajadiningrat |
| 2018/0350144 | A1 | 12/2018 | Rathod |
| 2018/0374276 | A1 | 12/2018 | Powers et al. |
| 2019/0004639 | A1 | 1/2019 | Faulkner |
| 2019/0098255 | A1 | 3/2019 | Bergmann et al. |
| 2019/0108578 | A1 | 4/2019 | Spivack et al. |
| 2019/0130656 | A1 | 5/2019 | Gebbie et al. |
| 2019/0171944 | A1 * | 6/2019 | Lu .......................... G06N 20/00 |
| 2019/0171986 | A1 | 6/2019 | Beznos et al. |
| 2019/0180506 | A1 | 6/2019 | Gebbie et al. |
| 2020/0005538 | A1 | 1/2020 | Neeter |

OTHER PUBLICATIONS

Harvard Business Review: Technology and Analytics. Why Every Organization Needs an Augmented Reality Strategy (Year: 2017).*
Office Action for U.S. Appl. No. 16/395,932, dated Apr. 17, 2020, Little, "Asynchronous Virtual Collaboration Environments", 10 pages.
Office Action for U.S. Appl. No. 16/163,099, dated Apr. 29, 2020, Little, "Method and System for Curating a Virtual Model for Feature Identification", 27 pages.
Office Action for U.S. Appl. No. 16/242,206, dated May 19, 2020, Little, "Virtual Environment Generation for Collaborative Building Assessment", 9 pages.
Office Action for U.S. Appl. No. 16/163,099, dated Jan. 15, 2020, Little, "Method and System for Curating a Virtual Model for Feature Identification", 22 pages.
Office Action for U.S. Appl. No. 16/242,206, dated Jan. 27, 2020, Little, "Virtual Environment Generation for Collaborative Building Assessment", 9 pages.
Office Action for U.S. Appl. No. 16/163,146, dated Dec. 19, 2019, Little, "Method and System for Identifying Conditions of Features Represented in a Virtual Model", 24 pages.
Office Action for U.S. Appl. No. 16/242,206, dated Jul. 18, 2019, Little, "Virtual Environment Generation for Collaborative Building Assessment", 9 pages.
Office Action for U.S. Appl. No. 16/395,932, dated Nov. 2, 2020, Little, "Asynchronous Virtual Collaboration Environments", 13 pages.
Advisory Action and AFCP Decision for U.S. Appl. No. 16/395,932, dated Jan. 12, 2021, Little, "Asynchronous Virtual Collaboration Environments", 7 pages.
Office Action for U.S. Appl. No. 16/397,407, dated Oct. 5, 2020, Little, "Asymmetric Collaborative Virtual Environments", 12 pages.
Office Action for US Patent AU.S. Appl. No. 16/163,146, dated Jul. 2, 2020, Little, "Method and System for Identifying Conditions of Features Represented in a Virtual Model", 32 pages.
Office Action for U.S. Appl. No. 16/163,099, dated Sep. 28, 2020, Little, "Method and System for Curating a Virtual Model for Feature Identification", 31 pages.
Office Action dated Feb. 22, 2021 for U.S. Appl. No. 16/163,146 "Method and System for Identifying Conditions of Features Represented in a Virtual Model" Little, 36 pages.
Office Action for U.S. Appl. No. 16/163,146, dated Nov. 24, 2021, Little, "Method and System for Identifying Conditions of Features Represented in a Virtual Model", 19 Pages.
Office Action for U.S. Appl. No. 16/163,146, dated Jul. 9, 2021, Little, "Method and System for Identifying Conditions of Features Represented in a Virtual Model", 20 Pages.
Office Action for U.S. Appl. No. 17/308,757, dated Mar. 10, 2022, Little, "Asymmetric Collaborative Virtual Environments", 35 Pages.
Office Action for U.S. Appl. No. 16/163,146, dated Mar. 17, 2022, Little, "Method and System for Identifying Conditions of Features Represented in a Virtual Model", 19 Pages.
Office Action for U.S. Appl. No. 17/308,891, dated Apr. 7, 2022, Little, "Method and System for Curating a Virtual Model for Feature Identification", 29 Pages.
Office Action for U.S. Appl. No. 17/308,891, dated Jul. 18, 2022, Little, "Method and System for Curating a Virtual Model for Feature Identification", 35 Pages.

* cited by examiner

PREDICTIVE ANALYTICS FOR ASSESSING PROPERTY USING EXTERNAL DATA

FIELD OF THE DISCLOSURE

The present disclosure relates to predictive analytics techniques that use external data to identify and assess properties, particularly within a virtual environment.

BACKGROUND

Conventionally, when evaluating real property (e.g., a commercial building, a residential home) for risk assessment purposes, a property specialist or other subject matter expert may be dispatched to the real property to assess the real property in-person. However, it is often expensive or time-consuming to dispatch subject matter experts out into a physical region to gather information about the prospective real property. In addition, subject matter experts are a limited resource, or have limited availability. Accordingly, it is often advantageous to gather useful information concerning real property in other ways, without relying heavily on in-person assessments. Furthermore, in situations that require in-person assessments, it is also advantageous to equip subject matter experts with as much useful information as possible prior to dispatching subject matter experts out to the real property. Accordingly, there is an opportunity for systems and methods for leveraging predictive techniques to assess real property.

Virtual visualization enables one to view an overall physical region without having to actually visit the physical region. Virtual visualization is particularly useful in situations in which physically visiting the physical region is difficult or expensive. However, traditionally it is difficult to incorporate information related to real property into virtual models. For example, conventional virtual models used by applications such as Google® Earth typically render 3D representations of Earth based on satellite imagery and cities from generally aerial angles, but do not provide detailed views of real property, particularly at side angles, to be of use for real property evaluators, at least in the risk assessment industry, to efficiently and effectively assess the real property. Accordingly, there is an opportunity for systems and methods for generating virtual models tailored for efficient and effective real property evaluation in a virtual environment.

SUMMARY

In one aspect, a computer-implemented method is provided. The method may include (1) identifying, by one or more processors, one or more data records in a database, the one or more data records comprising a reference set of information for at least a reference property evaluated with a reference risk score in accordance with a risk score rule that meets a predetermined threshold, wherein the reference set of information further comprises features, conditions of the features, or attributes of the reference property, wherein the risk score rule defines the reference risk score as a function of a set of weights and the reference set of information; (2) obtaining, by the one or more processors, an external data file from an external data source, wherein the external data file comprises one or more external data records comprising an external set of information for at least a prospective property, wherein the external set of information further comprises features, conditions of the features, or attributes of the prospective property; (3) comparing, by the one or more processors, the reference set of information with the external set of information to identify at least one common feature, condition of the feature, or attribute; (4) if at least one common feature, condition of the feature, or attribute is identified, evaluating the prospective property by determining a predicted risk score based on the external set of information in accordance with the risk score rule; (5) if the predicted risk score is determined to meet the predetermined threshold, generating at least one of an identifier for the prospective property or an evaluation report including context for the predicted risk score; and (6) providing the at least one of the identifier or the evaluation report to a user electronic device.

In another aspect, a system is provided. The system may include (i) one or more processors; (ii) one or more transceivers operatively connected to the one or more processors and configured to send and receive communications over one or more communication networks; and (iii) one or more non-transitory memories coupled to the one or more processors and storing computer-executable instructions. The instructions, when executed by the one or more processors, may cause the system to (1) identify one or more data records in a database, the one or more data records comprising a reference set of information for at least a reference property evaluated with a reference risk score in accordance with a risk score rule that meets a predetermined threshold, wherein the reference set of information further comprises features, conditions of the features, or attributes of the reference property, wherein the risk score rule defines the reference risk score as a function of a set of weights and the reference set of information; (2) obtain an external data file from an external data source, wherein the external data file comprises one or more external data records comprising an external set of information for at least a prospective property, wherein the external set of information further comprises features, conditions of the features, or attributes of the prospective property; (3) compare the reference set of information with the external set of information to identify at least one common feature, condition of the feature, or attribute; (4) if at least one common feature, condition of the feature, or attribute is identified, evaluate the prospective property by determining a predicted risk score based on the external set of information in accordance with the risk score rule; (5) if the predicted risk score is determined to meet the predetermined threshold, generate at least one of an identifier for the prospective property or an evaluation report including context for the predicted risk score; and (6) provide the at least one of the identifier or the evaluation report to a user electronic device.

In yet another aspect, a non-transitory computer-readable medium storing computer-executable instructions is provided. The instructions, when executed by one or more processors, may cause one or more processors to (1) identify one or more data records in a database, the one or more data records comprising a reference set of information for at least a reference property evaluated with a reference risk score in accordance with a risk score rule that meets a predetermined threshold, wherein the reference set of information further comprises features, conditions of the features, or attributes of the reference property, wherein the risk score rule defines the reference risk score as a function of a set of weights and the reference set of information; (2) obtain an external data file from an external data source, wherein the external data file comprises one or more external data records comprising an external set of information for at least a prospective property, wherein the external set of information further comprises features, conditions of the features, or attributes of the prospective property; (3) compare the reference set of information with the external set of information to identify at least one common feature, condition of the feature, or attribute; (4) if at least one common feature, condition of the feature, or attribute is identified, evaluate the prospective property by determining a predicted risk score based on the external set of information in accordance with the risk score rule; (5) if the predicted risk score is determined to meet the predetermined threshold, generate at least one of an identifier for the prospective property or an evaluation report including context for the predicted risk score; and (6) provide the at least one of the identifier or the evaluation report to a user electronic device.

Embodiments described herein generally perform predictive analytics to assess a prospective property (i.e., a property that has not yet been assessed of its risk) using external data associated with the prospective property received from an external source. Particularly, by comparing external data associated with a prospective property with characteristics of a qualified property that has been assessed as "low risk" for example, embodiments described herein predict whether the prospective property may also be assessed as "low risk." Advantageously, equipping subject matter experts with a novel source of prediction data effectively tailors their strategy to focus on potentially insuring prospective property likely to be assessed as "low risk." Thus, knowledge of predicted risk for a prospective property is a useful tool as it may allow businesses to prioritize prospective property having a predicted lower risk than others. If necessary, virtually representing the prospective property in a virtual environment facilitates additional follow-up assessments for the prospective property. In doing so, end users (e.g., subject matter experts) of the virtual environment are able to evaluate features or conditions of features of the prospective property remotely using the virtual environment without stepping foot onto the physical region including the prospective property.

DETAILED DESCRIPTION

The present aspects generally relate to using predictive analytics to determine and assess predicted risk for a prospective property. To do so, external data describing characteristics (e.g., features or conditions thereof) of the prospective property may be collected and stored by one or more back-end components and used to construct a prospective property profile. This external data may be compared with characteristics (e.g., features or conditions thereof) of a qualified property that has already been designated as "low risk" (i.e., with a low risk score that meets a predetermined threshold in accordance with a risk score rule), to identify common characteristics that may be relevant to assessing risk associated with the prospective property. If the prospective property is determined to include common characteristics, a predicted risk score may be calculated based on the external data or prospective property profile using the same risk score rule that assessed the qualified property as "low risk." If the predicted risk score also meets the predetermined threshold in accordance with the risk score rule, the prospective property may be pre-approved as a qualified prospective property.

Once the prospective property is pre-approved as a qualified property, some aspects include depicting the prospective property in a virtual environment for further assessment. For example, the virtual environment may be used to view visual representations of characteristics of the prospective property to assess the accuracy or inaccuracy of the external data that was used to generate the predicted risk score. Observations that could not have otherwise been made based on available external data, especially if inaccurate, may be assessed.

In some aspects, the predicted risk score for the prospective property or assessments made using the virtual environment may be used to provide customized promotional offerings for the prospective property. Promotional offerings may include, for example, specific targeted products or incentives that have been tailored to an individual or entity associated with the prospective property. This may include, for example, providing custom levels of rewards that are part of a rewards program, offering the individual or entity a discounted price for a particular service line, notifications regarding specific details about how and why the promotional offering details were calculated or otherwise selected for that individual or entity, and/or providing the individual or entity with other unique options that may not be available to other individuals or entities associated with "high risk" properties.

Figure 1:
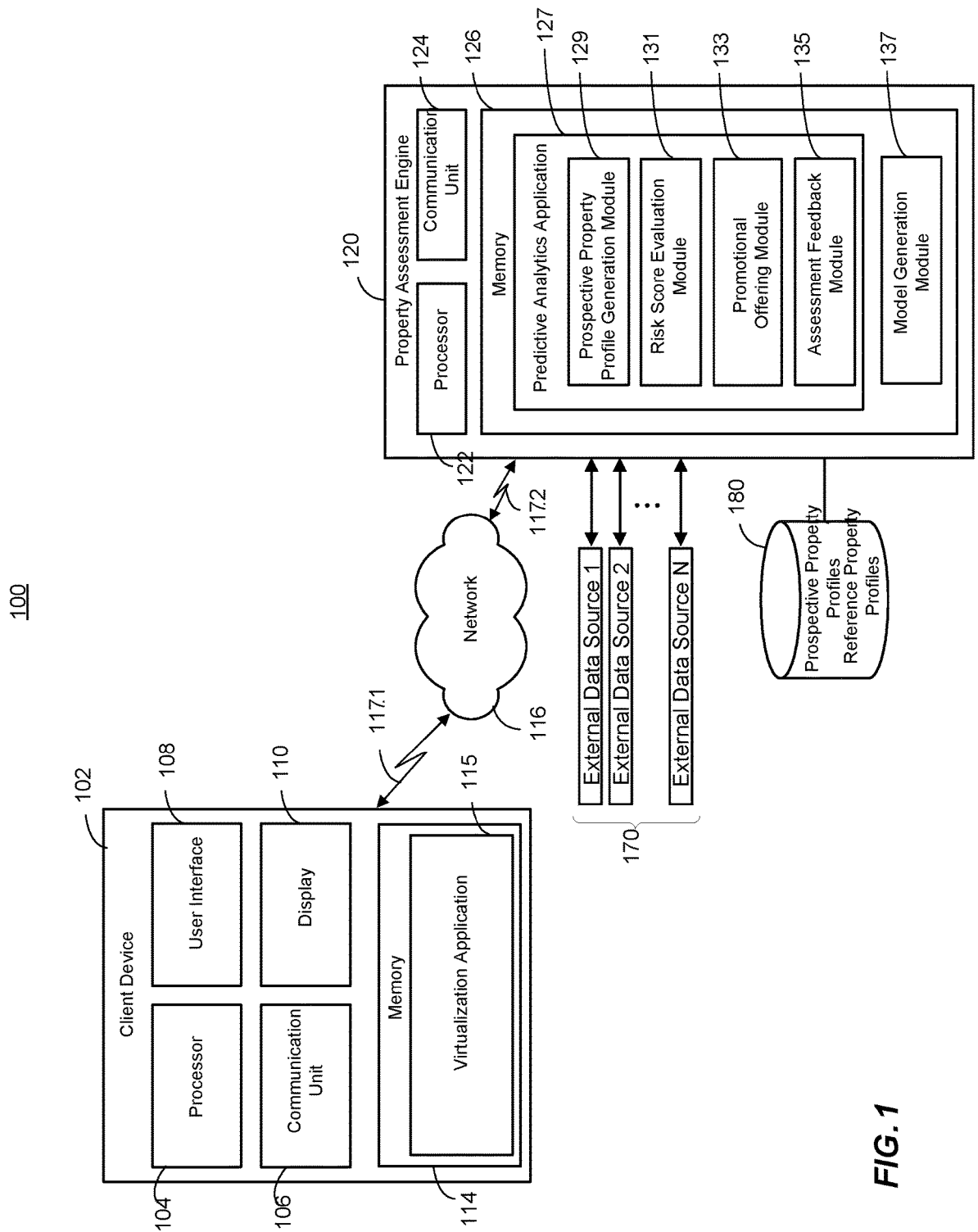
FIG. 1 depicts an example property assessment system in accordance with embodiments described herein.

FIG. 1 is a block diagram of an exemplary property assessment system 100 in accordance with an aspect of the present disclosure. In the present aspects, property assessment system 100 may include one or more client devices 102, a property assessment engine 120, and a communication network 116. Property assessment system 100 may include additional, fewer, or alternate components, including those discussed elsewhere herein.

For the sake of brevity, property assessment system 100 is illustrated as including a single client device 102, a single property assessment engine 120, and a single communication network 116. However, the aspects described herein may include any suitable number of such components. For example, property assessment engine 120 may communicate with several client devices 102, each of which may be operated by a separate user, to receive data from each separate client device 102 and/or to transmit data to each separate client device 102, as further discussed herein.

In the present aspects, property assessment engine 120 may be implemented, for example, as any suitable number and/or type of servers configured to access data from one or more additional data sources and/or store data to one or more storage devices. Property assessment engine 120 may be affiliated or otherwise associated with one or more parties. For example, property assessment engine 120 may be associated with one or more service providers that seek to have an ongoing relationship with an individual or entity associated with the prospective property. Although referred to herein as associated with "service providers," property assessment engine 120 may be associated with any suitable type of business entity that, through an ongoing relationship with one or more individuals or entities, attempts to assess risk for prospective properties associated with the one or more individuals or entities. These business entities may include for example, businesses traditionally known as service providers as well as businesses that may provide goods and/or services. For example, business entities associated with property assessment engine 120 may include any suitable businesses for which promotional offerings described herein may be applicable, such as insurance companies, lenders, retailers, consultants, utilities, subscription-based businesses, etc.

In the present aspects, property assessment engine 120 may include any suitable number of components configured to receive data from and/or send data to one or more of client devices 102 via communication network 116 using any suitable number of wired and/or wireless links. For example, property assessment engine 120 may constitute a portion of (or the entirety of) one or more back-end components, and may be configured (alone or in conjunction with other back-end components) to execute one or more applications to perform one or more functions associated with the various aspects as discussed herein. For example, property assessment engine 120 may communicate with one or more external computing devices such as servers, databases, database servers, web servers, etc. The present aspects include property assessment engine 120 working in conjunction with any suitable number and/or type of back-end components to facilitate the appropriate functions of the aspects as described herein.

As shown in FIG. 1, property assessment engine 120 may include one or more processors 122, a communication unit 124, and a memory unit 126. The property assessment engine 120 may access external data sources 170 directly and/or via one or more communication networks (e.g., via communication network 116) and/or via one or more radio links or wireless communication channels. External data sources 170 may provide external data that is made accessible by property assessment engine 120 from any number N of external data sources, such as third-party data providers or other data sources that maintain public or even private records (e.g., business records, commercial property records, residential property records, demographic data, etc.). Examples of external data include the market value of the property, age of the property, name of the owner of the property, name of businesses located within or in close vicinity to the property, geolocation information such as city zoning, historical claims data, etc. Property assessment engine 120 may utilize any portion of such external data (as well as data from other data sources), which may be stored as part of the prospective property profile, as input to predictive analytics algorithms to perform the assessments, predictions, virtual environment renderings, and/or promotional offering identifications as discussed herein, some examples of which are further discussed below.

The external data received via external data sources 170 may be utilized by property assessment engine 120 as part of the process of generating a prospective property profile for each prospective property, which may be stored in one or more suitable storage units (e.g., storage unit 180, memory 126) along with other types of data, as further discussed below. Property assessment engine 120 may access each prospective property profile (or the external data directly) as part of the execution of predictive analytics algorithms to calculate a predicted risk score for each prospective property. That is, property assessment engine 120 may generally analyze various characteristics (e.g., features or conditions thereof) stored in a prospective property profile to determine predicted risks for a service provider, for example. Particularly, the property assessment engine 120 may compare the various characteristics stored in the prospective property profile with characteristics of a qualified property that has already been designated with a low risk score, to identify common characteristics that may be relevant to assessing risk (i.e., indicative of low risk) associated with the prospective property. Absence of any common characteristics may result in denying the prospective property of a pre-approved status. The identified common characteristics in the prospective property profile, along with any other characteristics unique to the prospective property, may be assessed in a quantifiable way such as with a numeric score, a grade, a percentile ranking, etc. As an example, a predicted numeric risk score may be calculated based on the external data using the same risk score rule that designated the qualified property with the low risk score. If the predicted risk score also meets the predetermined threshold in accordance with the risk score rule, the prospective property may be pre-approved as a qualified prospective property.

As shown in FIG. 1, a predictive analytics application 127 may be stored in memory 126 of the property assessment engine 120. The predictive analytics application 127 may include one or more machine learning algorithms, code, logic, and/or instructions to facilitate the behavior, functionality, and/or processing of a predictive analytics computing system (e.g., property assessment system 100) configured to determine and assess predicted risk for a prospective property. Furthermore, one or more processors 122 may likewise be configured to provide processing functionality for the entirety of, or for one or more portions of, the predictive analytics computing system.

In the present aspects, the predictive analytics application 127 may include any suitable combination of functions as discussed herein. For example, as shown in FIG. 1, the predictive analytics application 127 may include a prospective property profile generation module 129 and a risk score evaluation module 131. These modules are for illustrative purposes and represent examples of some of the functionality that may be performed by property assessment engine 120 in accordance with a predictive analytics computing system. However, aspects include predictive analytics application 127 including additional, less, or alternate functionality, including those discussed elsewhere herein.

In one aspect, prospective property profile generation module 129 is a portion of memory unit 126 configured to store instructions, that when executed by one or more processors 122, cause one or more processors 122 to perform various acts in accordance with applicable embodiments as described herein. In the present aspects, instructions stored in prospective property profile generation module 129 may facilitate one or more processors 122 performing functions such as collecting, monitoring, tracking, mining, and/or storing external data received from external data sources 170 for any suitable number of prospective properties. Instructions stored in prospective property profile generation module 129 may also facilitate property assessment engine 120 in identifying reference property profiles or other suitable records in storage unit 180 as needed, to obtain a set of information for at least a qualified reference property that has already been evaluated as low risk. The set of information may include data for features or conditions of the features of the reference property.

In addition, instructions stored in prospective property profile generation module 129 may facilitate property assessment engine 120 in providing the requested authorization to external data sources 170 if needed, to receive the external data file or other external data from one or more of these sources, and to store the external data file or any suitable portion of this external data as part of each prospective property's respective prospective property profile. The external data file may include external data records containing external sets of information for each respective prospective property, such as features or conditions of the features of each respective prospective property or other attributes, such as age, an address, a market value, a name of business, a name of owner, agent affiliation, or zoning information. Features may include structure types, fixtures, materials of composition, or personal property associated with the property. Conditions of features may include details or states of the features other than simply the existence of the features, such as any visible damages, various components of the features, dimensions of the features, materials composing the features, and other suitable qualifications of features that provide information other than simply the existence or presence of the features. Examples include qualifications for structural frame type, exterior bearing walls, interior bearing walls, exterior nonbearing walls and partitions, interior nonbearing walls and partitions, floor construction, roof construction, fire-resistance ratings of building materials used in the construction of the building, etc. Properties or real property may include homes, buildings, yards, farms, or other suitable structures typically covered by insurance products, both in residential and commercial contexts.

In the present aspects, instructions stored in prospective property profile generation module 129 may facilitate property assessment engine 120 in comparing the received data mentioned above (i.e., set of information for at least a reference property and prospective property) to determine whether at least one common feature, condition of the feature, or attribute exists. The prospective property profile generation module 129 may include instructions to facilitate the identification of any suitable number of relevant features, conditions of the features, or attributes relevant to risk or other metric when assessing the prospective property as specified by the service provider. For example, prospective property profile generation module 129 may include instructions that identify the roof, wall, fences, or trees near the property using edge detection-based approaches, for example. Over time, a service provider may change these characteristics or how such characteristics are identified and update the instructions stored in prospective property profile generation module 129 as desired.

The instructions stored in prospective property profile generation module 129 may also facilitate one or more processors 122 in identifying features, conditions of the features, or attributes of a prospective property that are in common with features, conditions of the features, or attributes of a reference property by specifically comparing features, conditions of the features, or attributes relevant to assessing risks or other metric as specified by the service provider. In this way, by not comparing features, conditions of the features, or attributes that are nominal when assessing risk of property, the one or more processors 122 may preserve processing resources. If at least one common feature, condition of the feature, or attribute is identified, instructions stored in the prospective property profile generation module 129 may facilitate property assessment engine 120 storing information pertaining to the common feature, condition of the feature, or attribute in the prospective property profiles.

In one aspect, the risk score evaluation module 131 is a portion of memory unit 126 configured to store instructions, that when executed by one or more processors 122, cause one or more processors 122 to perform various acts in accordance with applicable embodiments as described herein. In the present aspects, instructions stored in risk score evaluation module 131 may facilitate one or more processors 122 in evaluating the prospective property by predicting a risk score based on the information for the prospective property stored in the prospective property profile in accordance with a risk score rule. That is, instructions stored in risk score evaluation module 131 may facilitate property assessment engine 120 in calculating a risk score for the prospective property by evaluating information included in the prospective property profile and its correlation to a measure of risk for the service provider. The risk score rule may be the same risk score rule that assessed the qualified reference property as "low risk." The risk score rule may define a risk score as a function of a set of weights and a set of information concerning features, conditions of features, or attributes for the prospective property. If the predicted risk score also meets the predetermined threshold in accordance with the risk score rule, the prospective property may be pre-approved as a qualified property.

Regardless of the techniques used to calculate the predicted risk score, which are discussed in further detail below, risk score evaluation module 131 may facilitate property assessment engine 120 in learning which features, conditions of features, or attributes are relevant and/or correlated with lower levels of risk. To do so, the present aspects include risk score evaluation module 131 causing property assessment engine 120 to determine which features, conditions of features, or attributes were previously correlated with lower levels of risk. Such characteristics of a qualified property that have already been designated as "low risk" may be, for example, associated with the reference property profiles stored in storage unit 180 (the details of which are further discussed below), for example, or may be associated with other characteristics that have otherwise been identified by the service provider as being particularly valuable in terms of low risk.

To provide an illustrative example, a correlation may be made such that, from the service provider's pool of reference property profiles, the 2 attributes most relevant to "low risk" are (1) age of the property (e.g., less than 25 years old) and (2) location of the property (e.g., in a low-crime area). As another example, the 2 features or conditions of features most relevant to "high risk" are (1) lack of any presence of security at the property (e.g., lack of fences, security systems) and (2) roof condition (e.g., roof damage). The property assessment engine 120 may perform this correlation with varying degrees of granularity, such that the presence of certain attributes or features are identified as having a greater impact on risk than others. In other words, the presence of some characteristics may be very likely to result in higher risk to the service provider while the presence of others are less likely to do so. The risk score evaluation module 131 may cause property assessment engine 120 to identify those prospective properties that have characteristics identified to contribute to a low risk valuation of property. Risk score evaluation module 131 may then cause property assessment engine 120 to calculate the predicted risk score of each prospective property based on these preferable characteristics.

Therefore, the present aspects include risk score evaluation module 131 facilitating property assessment engine 120 in assigning or otherwise associating a numeric characteristic value to each property characteristic identified by the service provider based upon each characteristic's correlation to risk. That is, property characteristics may be assigned a numeric characteristic value that indicates the particular relevance or correlation between the specific property characteristic and its impact of risk to the service provider. These numeric characteristic value may follow any suitable weighing system. For example, the numeric characteristic value may be selected as numeric values with a greater value indicating a greater correlation to "high risk" to the service provider.

To provide an illustrative example using the previously identified property characteristics, assume that a prospective property (1) is more than 25 years old, (2) is located in a low-crime area, (3) maintains a security system, and (4) has not been reported to have any roof damage, as indicated in one or more external data files received from one or more external data sources. From an analysis of reference property profiles stored in storage unit 180, a correlation may be identified between each of these property characteristics and service provider risk. Property assessment engine 120 may determine that property that is more than 25 years old is correlated to "moderate risk," and therefore this behavior is assigned a numeric characteristic value of 2 on a scale of 1-3. Similarly, property assessment engine 120 may determine that property that is located in a low-crime area, maintains a security system, or lacks any roof damage is correlated to "low risk," and therefore this behavior is assigned a numeric characteristic value of 1 on a scale of 1-3. Continuing this example, assume that an analysis of the reference property profiles with regards to the aforementioned property characteristics reveals that the dominant characteristic among all characteristics of the reference properties found to be attributable to an overall low risk score is the location of the property in a safe area. In this case, the location characteristic could be assigned a weight of 0.1, and the other characteristics (e.g., age, security, roof) could each be assigned a weight of 0.3.

Using the aforementioned weights and numeric values, the predicted risk score may then be calculated using a weighted average of these four property characteristics, which reflects the importance or dominance of each characteristic as well as the degree of risk for each characteristic exhibited by the prospective property. In the present illustrative example, the predicted risk score would be calculated based on a risk score rule as shown in Equation 1 below:

$$\text{Predicted Risk Score} = [(\text{Characteristic value 1}) \times (\text{Weight 1}) + (\text{Characteristic value 2}) \times (\text{Weight 2}) + (\text{Characteristic value 3}) \times (\text{Weight 3}) + (\text{Characteristic value 4}) \times (\text{Weight 4})]/4 \quad \text{Eqn. 1}$$

$$\text{Predicted Risk Score} = [(2) \times (0.3) + (1) \times (0.1) + (1) \times (0.3) + (1) \times (0.3)]/4 = 0.325.$$

Assuming that the risk score evaluation module 131 is preconfigured with a predetermined threshold of "0.4," the prospective property having a predicted risk score of 0.325 described above may meet the predetermined threshold since the predicted risk score of 0.325 is below the predetermined threshold of 0.4. Had the prospective property (1) been more than 25 years old, (2) located in a high-crime area, (3) maintained a security system, and (4) reported to have roof damage, the risk score for the prospective property using Equation 1 may be calculated as follows:

$$\text{Predicted Risk Score} = [(2) \times (0.3) + (3) \times (0.1) + (1) \times (0.3) + (2) \times (0.3)]/4 = 0.45.$$

For this case, the prospective property having a predicted risk score of 0.45 described above may not meet the predetermined threshold since the predicted risk score of 0.45 is above the predetermined threshold of 0.4. Therefore, even though the prospective property profile generation module 129 may have identified that at least one common feature, condition of the feature, or attribute exists between the prospective property and a reference property (e.g., a maintained security system), it is possible for the risk score evaluation module 131 to determine that the predicted risk score for the prospective property does not meet the predetermined threshold. Accordingly, the more common features, conditions of the features, or attributes that are identified between the prospective property and the reference property, the greater the likelihood that the risk score will meet the predetermined threshold. The property assessment engine 120 may therefore, in some embodiments, access storage unit 180 to read data from prospective property profiles and identify which prospective property profile best matches that of a reference property profile. For example, property assessment engine 120 may identify which prospective property profiles include the most property characteristics in common with a particular reference property profile, and calculate predicted risk scores for only the identified prospective property profiles.

If the predicted risk score meets the predetermined threshold, the prospective property profile generation module 129 may update the prospective property profile to indicate that the prospective property has been evaluated to have a predicted risk score that meets the predetermined threshold. As such, the prospective property may be considered "pre-approved." On the other hand, if the predicted risk score does not meet the predetermined threshold, the prospective property profile generation module 129 may update the prospective property profile to indicate that the prospective property has been evaluated to have a predicted risk score that does not meet the predetermined threshold. As such, the prospective property may be considered "rejected."

Again, any suitable number of property characteristics, scales, ranking, and/or weighting systems may be used to calculate the predicted risk score such that a particular prospective property may be quantified with respect to the level of risk that may accompany the property should the service provider desire to insure the property.

In the present aspects, promotional offering module 133 is a portion of memory unit 126 configured to store instructions, that when executed by one or more processors 122, cause one or more processors 122 to perform various acts in accordance with applicable embodiments as described herein. In the present aspects, instructions stored in promotional offering module 133 may facilitate one or more processors 122 in selecting, identifying, and/or generating a particular promotional offering for a prospective property having a predicted risk score that meets the predetermined threshold. Once identified, the prospective property profile may be associated with or otherwise linked to the particular promotional offering, which may include, for example, linking the prospective property profile to one or more flags, indicators, and/or data stored in any suitable storage device in which the promotional offering materials are stored or otherwise associated.

For example, a promotional offering may include any suitable type and/or number of actions undertaken by the service provider in an attempt to insure the prospective property. To provide some illustrative examples, promotional offerings may include a rewards program or discounted pricing for one or more goods or services provided by the service provider. In this way, promotional offerings may aim to leverage the predicted risk score calculated for a prospective property to prioritize it over other properties. For example, a service provider may assign or otherwise associate discounts, qualifications for certain bundled services, coupons, temporary offers, etc., upon a prospective property having a predicted risk score that meets the predetermined threshold. By selectively targeting pre-approved prospective properties in this way, service providers may be more risk averse, and promotional offerings can be highly focused and more likely to be effective.

In the present aspects, the prospective property profile generation module 129 may generate a prospective property identifier corresponding to the pre-approved prospective property profile for transmittal to the client device 102, informing the client device 102 of the pre-approved nature of the prospective property, and/or any promotional offerings that are available. In some embodiments, as will be further described below, the identifier may correspond to a visual representation of the pre-approved prospective property in accordance with a virtual model rendered in a virtual environment at the client device 102, so that a user of the virtual environment may further evaluate the pre-approved prospective property. In such embodiments, the property assessment engine 120 may include an assessment feedback module 135 in a portion of memory unit 126 that is configured to store instructions, that when executed by one or more processors 122, cause one or more processors 122 to perform various acts in accordance with applicable embodiments as described herein. In the present aspects, instructions stored in the assessment feedback module 135 may facilitate one or more processors 122 receiving feedback regarding the pre-approved prospective property as depicted in the virtual environment. Additionally or alternatively, instructions stored in assessment feedback module 135 may facilitate one or more processors 122 confirming or modifying the pre-approved prospective property profile based upon this received feedback.

In the present aspects, property assessment engine 120 may be configured to send or otherwise transmit various types of data to a client device 102. In various aspects, client device 102 may be implemented as any suitable communication device. For example, client device 102 may be implemented as a user equipment (UE) and/or client device, such as a smartphone, for example. To provide additional examples, client device 102 may be implemented as a personal digital assistant (PDA), a desktop computer, a tablet computer, a laptop computer, a wearable electronic device, smart glasses or goggles, a personal virtual reality device, or any other electronic device. Data sent between the property assessment engine 120 and the client device 102 via communication unit 124 may include any suitable number and/or type of data transmissions.

For example, the property assessment engine 120 may provide the predicted risk score of the property to the client device 102. The property assessment engine 120 may not only provide the predicted numeric risk score, but may also provide an evaluation report that includes context of the predicted numeric risk score. Particularly, the evaluation report may identify characteristics of the property and explain how the characteristics contributed to the predicted numeric risk score. For instance, the evaluation report may indicate that certain characteristics (e.g., property is less than 25 years old, property maintains a security system) particularly led to a low predicted risk score, or that certain characteristics (e.g., property reported to have roof damage) particularly led to a high predicted risk score. In some embodiments, the property assessment engine 120 may provide the predicted risk score and/or evaluation report only if the predicted risk score meets the predetermined threshold in accordance with the risk score rule, so that the client device 102 receives information pertaining to prospective properties that are pre-approved as a qualified prospective property, for display to a user of the client device 102. Accordingly, and advantageously, the user would be able to rank the qualified prospective properties or otherwise discern qualified prospective properties that barely were pre-approved, from qualified prospective properties that clearly stood out from the rest as stronger candidates for insuring, for example. In other embodiments, the property assessment engine 120 may provide the predicted risk score and/or evaluation report regardless of whether the predicted risk score meets the predetermined threshold. As such, the client device 102 may receive information pertaining to prospective properties that have not been pre-approved as a qualified prospective property. In this way, the user and/or client device 102 may discern which characteristics of the prospective property particularly led to a high predicted risk score. As such, identifying characteristics responsible for a high predicted risk score may be an opportunity for the user and/or client device 102 to suggest improvements to, for example, homeowners of the prospective property that would lower the predicted risk score and potentially place the prospective property in a better position for insuring. Similarly, for qualified prospective properties, identifying characteristics responsible for a low predicted risk score may be an opportunity for the user and/or client device 102 to suggest improvements to, for example, homeowners of the prospective property that would maintain or further lower the predicted risk score by reducing or eliminating certain hazards.

As another example, the property assessment engine 120 may generate an identifier (e.g., property ID, location ID) for the pre-approved prospective property and transmit the identifier to the client device 102. As another example, the property assessment engine 120 may provide a virtual environment to the client device 102. The identifier for the pre-approved prospective property may correspond to a visual representation of the pre-approved prospective property in accordance with a virtual model rendered in the virtual environment at the client device 102. As such, a user of the client device 102 may further assess the pre-approved prospective property using the virtual environment if necessary without physically being present at the property. Further, as another example, the property assessment engine 120 may provide promotional offerings to the client device 102. In this way, the present embodiments described herein may advantageously provide useful information concerning real property to users (e.g., property specialists, agents) of the client device 102 to equip the users with as much useful information as possible prior to dispatching the users out to the prospective real property.

The property assessment engine 120 may also receive feedback data from the client device 102 such that a prospective property profile for each prospective property may include the received data. For example, the client device 102 may provide feedback data back to the property assessment engine 120 after a user views visual representations of the prospective property in the virtual environment. The feedback data may indicate an assessment of the accuracy or inaccuracy of the external data used in calculating the predicted risk score. For example, if the external data for the prospective property indicates that the construction type of the prospective property is of a masonry noncombustible construction type, but the visual representations of the prospective property in the virtual environment indicates a frame construction type, the client device 102 may provide an assessment indicating the inaccuracy, which may cause an adjustment in the predicted risk score. The feedback data may also include characteristics of the prospective property that were not documented in the external data. For example, information such as conditions of roof (e.g., age of the roof, damages in the roof, etc.) are typically not provided by external data sources 170, the absence of which may lead to an inaccurate risk score. Therefore, if the visual representations of the prospective property in the virtual environment indicates damages in the roof, the client device 102 may provide an assessment indicating the roof condition. The property assessment engine 120 may analyze the feedback data and adjust the prospective property profiles to include the feedback data. The property assessment engine 120 may also updated the predicted risk scores for the prospective property profiles after receiving such feedback data in accordance with the risk score rule.

In the present aspects, client device 102 may include one or more processors 104, a communication unit 106, a user interface 108, a display 110, and a memory unit 114. Communication unit 106 may be configured to facilitate data communications between client device 102 and one or more of communication network 116 and/or property assessment engine 120 in accordance with any suitable number and/or type of communication protocols. In the present aspects, communication unit 106 may be configured to facilitate data communications based upon the particular component and/or network with which client device 102 is communicating. Such communications may facilitate the transmission of collected data between one or more client devices 102 and property assessment engine 120. In the present aspects, communication unit 106 may be implemented with any suitable combination of hardware and/or software to facilitate this functionality. For example, communication unit 106 may be implemented with any suitable number of wired and/or wireless transceivers, network interfaces, physical layers (PHY), ports, antennas, etc.

User interface 108 may be configured to facilitate user interaction with client device 102, particularly for interacting with the virtual environment. For example, user interface 108 may include a user-input device such as an interactive portion of display 110 (e.g., a "soft" keyboard displayed on display 110), an external hardware keyboard configured to communicate with client device 102 via a wired or a wireless connection (e.g., a BLUETOOTH keyboard), an external mouse, or any other suitable user-input device.

Display 110 may be implemented as any suitable type of display that may facilitate user interaction with a virtual environment, such as a capacitive touch screen display, a resistive touch screen display, etc. In various aspects, display 110 may be configured to work in conjunction with user interface 108 and/or one or more processors 104 to detect user inputs upon a user selecting a displayed interactive icon or other graphic within the virtual environment, to identify user selections of objects displayed via display 110, to display visual representations of the prospective property by rendering a virtual model associated with the prospective property, and to display visual overlays tied to information, such as the external data, in the virtual environment.

One or more processors 104 may be implemented as any suitable type and/or number of processors, such as a host processor for the relevant device in which client device 102 is implemented, for example. One or more processors 104 may be configured to communicate with one or more of communication unit 106, user interface 108, display 110, and/or memory unit 114 to send data to and/or to receive data from one or more of these components. For example, one or more processors 104 may be configured to communicate with memory unit 114 to store data to and/or to read data from memory unit 114. In accordance with various embodiments, memory unit 114 may be a computer-readable non-transitory storage device, and may include any combination of volatile (e.g., a random access memory (RAM)) or a non-volatile memory (e.g., battery-backed RAM, FLASH, etc.). In the present aspects, memory unit 114 may be configured to store instructions executable by one or more processors 104. These instructions may include machine readable instructions that, when executed by one or more processors 104, cause one or more processors 104 to perform various acts.

In some aspects, a virtualization application 115 is a portion of memory unit 114 configured to store instructions, that when executed by one or more processors 104, cause one or more processors 104 to perform various acts in accordance with applicable aspects as described herein. For example, instructions stored in virtualization application 115 may facilitate one or more processors 104 performing functions such as displaying a virtual environment, collecting various types of data (e.g., user input collected by the virtual environment), sending various types of data to the property assessment engine 120, receiving data from the property assessment engine 120, displaying promotional offering information, notifications and/or other information received via the property assessment engine 120, etc.

Communication network 116 may be configured to facilitate communications between one or more client devices 102 and/or property assessment engine 120 using any suitable number of wired and/or wireless links, such as links 117.1-117.2, for example. Communication network 116 may include any suitable number of nodes, additional wired and/or wireless networks that may facilitate one or more landline connections, internet service provider (ISP) backbone connections, satellite links, public switched telephone network (PSTN), etc. To facilitate communications between the various components of property assessment system 100, the present aspects include communication network 116 being implemented, for example, as a local area network (LAN), a metropolitan area network (MAN), a wide area network (WAN), or any suitable combination of local and/or external network connections. To provide further examples, communications network 116 may include wired telephone and cable hardware, satellite, cellular phone communication networks, base stations, macrocells, femtocells, etc. In the present aspects, communication network 116 may provide one or more client devices 102 with connectivity to network services, such as Internet services, for example, and/or support application programming interface (API) calls between one or more client devices 102 and/or property assessment engine 120.

Client device 102 may be configured to communicate using any suitable number and/or type of communication protocols, such as Wi-Fi, cellular, BLUETOOTH, NFC, RFID, etc. For example, client device 102 may be configured to communicate with communication network 116 using a cellular communication protocol to send data to and/or receive data from the property assessment engine 120 via communication network 116 using one or more of links 117.1-117.2.

According to some aspects, virtual models may be developed to specifically depict features or conditions of features (e.g., conditions of structures, roofs, walls, trees, fences) of a prospective property located within an overall region and rendered within the virtual environment that may assist a user of the virtual environment in evaluating risk for the prospective property. As will be further described herein, virtual models may be further developed to also include annotations and/or external data (e.g., public or proprietary data) mapped to the features or conditions of the features to further assist a user when assessing the prospective property when the virtual model is rendered in a virtual environment. The virtual environment may be viewed by a user for the purpose of evaluating the prospective property without stepping foot on the prospective property. Features, conditions of features, or attributes associated with the prospective property that have been annotated, emphasized, or otherwise identified in the virtual model may be mapped to visual overlays when rendered in the virtual environment. Therefore, displaying such features, conditions, or attributes in the virtual environment may advantageously facilitate a user in assessing damage or risk. Displaying features or conditions of features in the virtual environment may also assist a user in identifying external data often missing or inaccurate in the external data file. As an example, the external data file may indicate that the roof is not damaged, but the rendering of the roof in the virtual environment may indicate an aging roof that is likely to be damaged in a short period of time, or a small crack in the roof that is likely to expand. As another example, the external data file may indicate that the age of the property is 100 years old, but the rendering of the property in the virtual environment may indicate newly constructed property. As another example, the external data file may not have accounted for a tree leaning too closely to the property, but a rendering of the tree in the virtual environment may signify a risk. Of course, for some of the aforementioned examples, the virtual models may need to be developed using high resolution images that show the texture and/or color of material, which may be a highly relevant factor when assessing the roof construction, for example.

As such, users (e.g., property specialists, agents, or other subject matter experts) may point out particular features or conditions of features that appear to expose the prospective property to liabilities or lack thereof in the virtual environment. Such conditions of features exposing the property to liabilities or lack thereof may be used to further evaluate the predicted risk score for the property, which may be used in various risk applications, such as selecting a particular promotional offering as described herein. Users may emphasize features, conditions, or attributes of the property directly in the virtual environment (e.g., by toggling on and off visual overlays corresponding to the features, conditions, or attributes). Accordingly, as subject matter experts are few in number and often a limited resource, providing the virtual environment depicting prospective properties to users solves a problem, particularly in insurance risk assessment industries.

In some embodiments, external data relevant to the prospective property received from the external data sources 170 may be visually represented in the virtual environment. Different types of property (e.g., single-story home, multi-story home, residential condominiums, commercial buildings) carry different risks, and different features of the property and conditions thereof may be factors in evaluating risks. For instance, representing external data indicating that a particular property is over 100 years old without any historical records of roof repair in the virtual environment may facilitate evaluating the condition of the roof in the virtual environment. As another example, external data showing the name of a business visually represented in an area corresponding to a residential neighborhood in the virtual environment may facilitate evaluating risk for the business. Therefore, rendering the aforementioned features, along with external data in the virtual environment may advantageously facilitate users (e.g., underwriters, property specialists, agents) when evaluating the particular features of the prospective property rendered in a virtual environment, saving the user time and resources by not needing to physically be present at the property to analyze the property.

To generate a virtual model of one or more prospective properties in an overall region, the property assessment engine 120 may obtain a pre-existing virtual model stored in memory (e.g., memory 126) or from a third party (e.g., an external data source 170) for further development, or generate a new virtual model, by dispatching an imaging vehicle to capture a set of image data indicative of the overall region of interest including the one or more prospective properties. The imaging vehicle may be, for example, an aerial imaging drone, an imaging crawler robot, or any other imaging vehicle. The imaging vehicle may be controlled autonomously, semi-autonomously, or manually by either a remote or an on-site controller or pilot. The imaging vehicle may traverse the overall region to capture a set of image data representative of the overall region, particularly of the one or more prospective properties within the overall region. The imaging vehicle may transmit the captured set of image data to the property assessment engine 120 for storage.

In some embodiments, the imaging vehicle may receive an address or other suitable location identification information (e.g., GPS coordinates) of the prospective property from the property assessment engine 120. In such embodiments, the imaging vehicle may capture higher resolution images of the features or conditions of features associated with the prospective property at the address and lower resolution images of areas within the overall region outside a predetermined radius of the property, as features and conditions thereof contained in outside regions (e.g., a park 3 miles away) may be irrelevant when assessing the prospective property. As will be described in greater detail below, replacing targeted low-resolution images of the prospective property with higher-resolution images of the property may be performed in accordance with feature condition rules to develop or otherwise adapt virtual models.

In some implementations, a user and/or the property assessment engine 120 may determine one or more image capture characteristics for capturing the set of image data, such as an image resolution, an image capture rate, an image angle, an altitude from which image data is captured, and/or a travel path of the imaging vehicle. In manual implementations, the user may select from a menu of previously determined routines and functions to set the image capture characteristics. Particularly, the image angle and altitude from which image data is captured may be set such that details of the top, bottom, front, back, and side views of the one or more prospective properties may be accurately captured and presented for analysis. In automated implementations, the property assessment engine 120 may be preconfigured with image capture characteristics, and may modify the image capture characteristics based on trigger conditions. For instance, upon receiving an address of a prospective property, the property assessment engine 120 may adjust the image resolution to the next available image resolution that is higher than the preset image resolution when capturing locations within a predetermined radius from the received address.

The property assessment engine 120 may obtain the captured set of image data either stored in memory 126 or directly from the imaging vehicle to generate a virtual model or otherwise further develop a pre-existing virtual model of the overall region using virtual modeling techniques described below. Generally, a virtual model of an overall region including property is a digital representation of the physical property and surrounding physical areas of the physical property. The virtual model may be developed at the property assessment engine 120 via a model editing software (i.e., a suitable model generation module 137) so that a user or the property assessment engine 120 may, based on digital representations of features or conditions of the features of the physical property, assess the features or conditions of the features. Therefore, in some embodiments, to improve the effectiveness of the visual experience of the user when the virtual model is rendered in a virtual environment for assessment purposes, the property assessment engine 120 may, via a model generation module implemented with feature condition rules, develop (e.g., modify, add, or remove certain vertices of a virtual model, and/or add annotations or other indicators to emphasize certain features or conditions of features of the modeled property) or otherwise generate or modify the virtual model such that it meets a minimum level of detail so that information necessary to evaluate features or conditions of features of a property may be clearly depicted in the virtual environment when rendered. To do so, the feature condition rules may be configured to determine whether the captured set of image data corresponding to the prospective property exceeds a predetermined image resolution threshold so that image data depicting features or conditions of features may be properly assessed. In some embodiments, a feature condition rule may identify a particular feature or particular condition of a feature of a property and associate an annotation or other suitable indicator with the identified feature or condition of the feature. For example, the model generation module 137 at the property assessment engine 120 may be configured to receive a user-identified assessment of a condition of a feature that may be relevant to risk when assessing property. The user, such as a property specialist or a user trained in developing virtual models, may use a mouse or other conventional input device and select certain features or conditions of features, and/or place annotation objects and other suitable data objects onto selected features or conditions of features of the property. The feature condition rule may, upon receiving such user selections, associate the annotation objects and other suitable data objects with the selected features or conditions of features, and subsequently generate annotation overlays and/or data record overlays corresponding to the selected features or conditions to depict information included in the annotation objects and/or data objects in the virtual model.

Annotation objects may include notes for adding information (e.g., title of the identified feature or condition of the feature, description of an assessment of the identified feature or condition of the identified feature) to modeled features or conditions of features represented in the virtual model. Annotation objects may also include interactive interface elements that further specify how the feature or condition of the feature may be emphasized visually (e.g., highlighting, coloring, textual shading, etc.) by the annotation overlays when rendered in the virtual environment. Other suitable data objects may include information from external data described above, which may be publicly accessible records (e.g., market value of the property, age of the property, address of the property, name of business located at the property, a name of an owner of the property, agent affiliation of the property, zoning information of the property) and/or proprietary records (e.g., historical claims data recorded for the property). Because each annotation object and/or data object corresponds to a particular feature or condition of the feature that has a virtual location (e.g., coordinates of a virtual coordinate system) within the virtual model, each annotation object and/or data object may be identified by the virtual location. As will be further described herein, the virtual model may be linked with an annotations database and/or data records database that store records corresponding to the annotation object and/or data object, respectively. Accordingly, the annotation object and/or data object associated with a feature or condition of the feature may be integrated into the virtual model, and upon render, visual overlays may be populated at the virtual locations corresponding to the annotation object and/or data object within the virtual environment.

As another example, the particular feature or condition of the feature that may be relevant to risk when assessing property may be identified and assessed automatically, at least preliminarily by the model generation module 137 at the property assessment engine 120. Particularly, the model generation module 137 may be configured with feature condition rules that may define templates data to include templates of features or conditions of features relevant to risk when assessing property, such as a tree leaning towards the property, a fence or gate without a locking mechanism, roof damage, or any other conditions of features. For example, the templates data for a damaged roof may comprise images depicting edges of various types of roofs and roof damage at various view points and in different sizes and scales. The templates data for a leaning tree may comprise images of various types of trees under various conditions, such as changes in lighting or color, changes in view direction, etc. Similarly, templates data may be defined to exclude templates of conditions of features that may be irrelevant to assessing risk for the property that happened to be captured at the time the imaging vehicle captured the set of image data, such as children playing in a yard, a vehicle parked a mile away from the property, a design engraved on a door of the property, exterior window shutters, decorative pillars, etc. In some embodiments, after the model generation module 137 determines a preliminary assessment, a user may further assess the preliminary assessment, by viewing the property in the virtual environment.

The feature condition rules may also define a manner in which the model generation module 137 compares the set of actual image data with the templates data based on object recognition technology to identify and assess the particular feature or condition of the feature that may be relevant to risk when assessing property. For example, the feature condition rules may exhibit edge detection-based approaches as known in the art to cause the model generation module 137 to compare the templates data with the set of image data pertaining to the property to determine whether the edges of features or conditions of features detected in the set of image data match the edges in the templates data according to a predetermined threshold (e.g., based on the number of matching edges). As another example, the feature condition rules may exhibit appearance-based approaches as known in the art to cause the model generation module 137 to compare the templates data with the set of image data pertaining to the property to determine whether the appearance of features or conditions of features detected in the set of image data match the appearance in the templates data according to a predetermined threshold (e.g., based on the number of matching appearances). By comparing pixels between the set of image data and templates data and finding a group of pixels that match (e.g., in intensity using a sum of absolute differences approach (SAD)), features or conditions of features in the set of image data may be identified with respect to features or conditions that have already been identified in the templates data. For example, if templates data includes pixel information that is evaluated to correspond to a fence, a set of image data having pixel information that matches the pixel information included in the templates data may be predicted to be a fence. The model generation module may then identify or otherwise mark (e.g., tag) any of the image data that match the templates for inclusion in the virtual model, such that features or conditions captured in the images are represented in the virtual model. Any unmarked image data may be excluded from the virtual model, in some embodiments. The property assessment engine 120 may store the resulting virtual models in a model database. Because the virtual model may include less data than a conventional virtual model that does not exclude any features that may be irrelevant to assessing risk for various properties, the property assessment engine 120 or other suitable electronic device may advantageously use less memory space to render the virtual model than for other conventional virtual models in the virtual environment.

In some embodiments, the feature condition rules may also define a manner in which the model generation module 137 updates a pre-existing virtual model. For example, the feature condition rules may cause the model generation module 137 to receive identification information for a desired property (e.g., an address or other location information for the prospective property) and compare such information to location metadata included in image data used when the pre-existing virtual model was initially created. Upon identifying the matched set of image data corresponding to the address of the prospective property, the feature condition rules may cause the model generation module 137 to evaluate the image resolution of the matched set of image data to determine whether it meets a predetermined image resolution threshold. If the matched set of image data is determined to not meet the predetermined image resolution threshold, the feature condition rules may cause the model generation module 137 to replace the low-resolution images with higher-resolution images of the property. If higher-resolution images of the property are unavailable in an image database, the feature condition rules may cause the model generation module to dispatch an imaging vehicle to capture images of the property at the specified address at a specified resolution.

Obtaining higher-resolution images may be necessary in the event that the model generation module 137 is unable to automatically determine whether a captured set of image data matches with templates data (e.g., due to a lack of image quality of a portion of the set of image data). Obtaining higher-resolution images for a feature or condition of the feature of a property may also be necessary in the event that a user is unable to identify the feature or a condition of the feature when the virtual model is rendered in the virtual environment. Accordingly, the model generation module 137 may provide a command to the remote imaging vehicle to collect more images for the particular feature or condition of the feature. Upon receiving the additional images, the model generation module 137 may continue to assess the images in a similar manner described above.

In some embodiments, as briefly described above, a feature or condition of the feature that may be relevant to risk when assessing property may be identified and assessed by a user viewing the feature or condition of the feature in a virtual environment at a client device 102. Particularly, the model generation module 137 may be configured with feature condition rules that receive messages from the client device 102. In some instances, the messages may include an assessment of the feature. In other instances, particularly when the image data used in generating the virtual model does not clearly depict the feature when rendered in the virtual environment for user assessment, the message may include an indication that the condition cannot be assessed. The message may further include an annotation made by the user indicated in the virtual environment at a virtual coordinate corresponding to the one or more features, so that the feature condition rules may translate the virtual coordinate into Global Positioning System (GPS) coordinates corresponding to the one or more features and subsequently provide an image capture request to the remote imaging vehicle for capturing additional images of the one or more features.

In some embodiments, the model database may store multiple versions of a particular virtual model. For example, one version of the virtual model may be based on coarse image data captured in some portions of the prospective property and fine image data captured in other portions of the prospective property, and a second version of the virtual model may be based on fine image data captured in all portions of the prospective property. As another example, one version of the virtual model may include data objects based on external data, and a second version of the virtual model may exclude such data objects. As another example, one version of the virtual model may include annotation objects that emphasize a condition of one or more features of the property, and a second version of the virtual model may exclude such annotation objects. Accordingly, the property assessment engine 120 may generate tailored virtual models appropriate for a given situation. For example, for assessment purposes described above, the property assessment engine 120 may generate a virtual model that includes fine image data captured for various features and conditions of features within the prospective property, to help users evaluate the predicted risk score that was generated by the risk score evaluation module 131 based on external data.

The users described above (e.g., property specialists, agents, or other subject matter experts) may interact with a client device 102 to view a rendering of the virtual environment. In some embodiments, the display 110 of the client device 102 may enable the user to view the virtual environment in a virtual or mixed reality environment. According to aspects, the display 110 may be a flat panel screen, or a separate virtual reality or mixed-reality display device communicatively coupled to the client device 102.

In one aspect, the client device 102 may access the virtual environment by sending, to the property assessment engine 120, a data request indicative of a particular portion of the overall region, such as the desired property. The data request may include an address of the property, a zip code of the property, or other identification information of the property. The data request may also specify a particular version of the virtual model, such as any version of the virtual model described above. In this way, an agent for example may request a version of the virtual model including annotation objects and/or data objects, and an underwriter for example may request a different version of the virtual model including data objects and excluding annotation objects. The data request may also include an indication of the type of client device 102, which may indicate a type of virtual environment (e.g., mixed reality environment, virtual reality environment) it supports. In response, the property assessment engine 120 may dynamically provide, to the client device 102, a virtual environment or mixed reality environment for rendering an appropriate virtual model for the particular property within the overall region based on the data request.

It should be appreciated that when the user views the virtual environment via the client device 102, portions of the virtual environment may not be visible. To this end, the portion of virtual environment visible to the user may be defined by a virtual camera object. The user may interact with the client device 102 to move or otherwise interact with the virtual camera object. For example, the user may move, zoom, rotate, or otherwise adjust the virtual camera object. The portion of the virtual environment viewable from the virtual camera object is referred to as the viewing angle.

In some embodiments, the client device 102 analyzes a viewing angle to determine how the virtual environment should be depicted by the client device 102. In these embodiments, rendering involves the client device 102 analyzing the virtual model to determine how the client device 102 should depict the virtual environment based on the viewing angle. In embodiments describing communications that have sufficiently low latency, such as 5G technologies and beyond, the client device 102 may transmit indications to the property assessment engine 120 of any change to the viewing angle and the property assessment engine 120 may respond with visual representations of how the virtual environment should be depicted. Accordingly, in these embodiments, "providing" the virtual environment to a client device 102 for rendering may include the property assessment engine 120's response indicating how the virtual environment should be depicted.

In another aspect, the client device 102 may interact with the virtual environment by activating display of overlays corresponding to the annotation objects included in the virtual models associated with features or conditions of features of the property. For example, upon selection (e.g., by touch using a personal virtual reality device, by line of sight using smart goggles) of digital representations of the features or conditions of features of the property rendered in the virtual environment, the property assessment engine 120 may generate an annotations overlay corresponding to the selected one or more features to depict information included in the annotation objects associated with particular property and/or features. The property assessment engine 120 may then update the virtual environment to populate the annotations overlay. Accordingly, when the client device 102 refreshes the rendering of the virtual environment, the virtual environment may include these annotation overlays. Other overlays are contemplated. In some embodiments, the property assessment engine 120 may generate a data records overlay on the virtual environment to depict information included in the data objects (e.g., information from external data file) associated with particular property and/or features.

Advantageously, users of the client device 102 may be able to evaluate risk of the prospective property according to what they see in the virtual environment without being physically present at the property. Accordingly, the client device 102 may communicate a risk assessment back to the property assessment engine 120 (i.e., the assessment feedback module 135), which in turn may provide the risk assessment to the risk score prediction module 131 to adjust the predicted risk score. The adjusted risk score can be used to provide customized promotional offerings for the prospective property, as discussed above.

Figure 2:
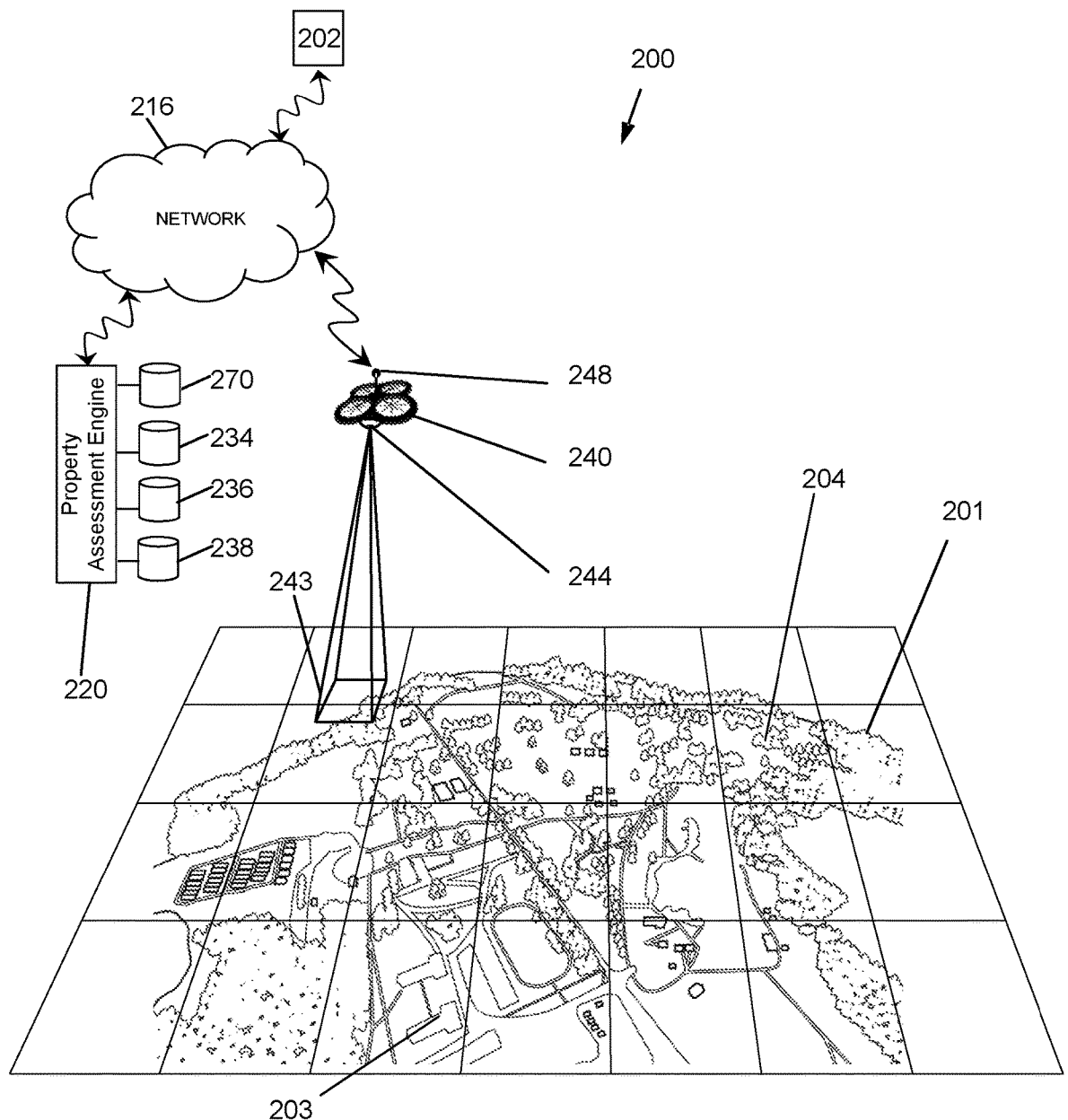
FIG. 2 depicts an example environment for capturing a set of image data representative of an overall region.

FIG. 2 depicts an example environment 200 for capturing a set of image data representative of an overall region 201. As illustrated, the environment 200 includes an imaging vehicle 240 configured to capture the set of image data. The overall region 201 may include one or more prospective properties. Although FIG. 2 only depicts a single imaging vehicle 240, in other embodiments multiple imaging vehicles 240 may be used to capture the set of image data. Further, while FIG. 2 depicts the imaging vehicle 240 as an aerial drone, additionally or alternatively, the imaging vehicle(s) 240 may include a non-aerial drone or vehicle, such as a crawler or an aquatic drone. Further, although the image data is generally described herein as being visual-spectrum image data, the image data may include thermal imaging data and/or image data indicative of radiation levels. For instance, capturing and representing a condition, such as a chemical leak or unusual odor in the virtual model, may signal to a user upon render in a virtual environment to further assess the source of the chemical leak or unusual odor.

According to certain aspects, the imaging vehicle 240 may be manually or autonomously piloted to capture a set of image data while traversing the overall region 201. The imaging vehicle 240 may include an imaging apparatus 244 configured to capture image data indicative of a field of imaging 243. As the imaging vehicle 240 traverses the overall region 201, the field of imaging 243 also moves. Accordingly, the imaging vehicle 240 may capture imaging data indicative of the different portions of the overall region 201. It should be appreciated that in some embodiments, the field of imaging 243 is not at a fixed angle below the imaging vehicle 240, but may pan, tilt, and/or zoom to capture image data indicative of the overall region 201 at different angles, such that 360° views, including side views, of the property may be captured. In some implementations, the imaging vehicle 240 captures image data such that there is an overlap between successive sets of captured image data. These overlaps provide additional image data (e.g., different views) about the same location of the overall region 201, which enables more accurate determination of the identities and dimensions of features (e.g., structures, trees, roads, water, and so on) and conditions thereof of the overall region. It should be appreciated that if the imaging vehicle 240 captures the set of image data at a high-altitude and/or without focusing on a particular portion of the overall region 201, the set of image data may lack sufficient detail to support some of the aforementioned virtual model development tasks. It should also be appreciated that high-resolution image data may be unnecessary for certain portions of the overall region 201. For example, if the aim for generating the virtual model is to identify real properties located in sub-region 203, sub-region 203 indicative of real property may be captured in a higher resolution than another region (e.g., sub-region 204) within the overall region 201 that is miles away from sub-region 203.

The imaging vehicle 240 may also include a communication apparatus 248 for transmitting, via a wireless communication network 216, the captured set of image data to a property assessment engine 220. The communication network 216 may support communications via any standard or technology (e.g., GSM, CDMA, TDMA, WCDMA, LTE, EDGE, OFDM, GPRS, EV-DO, UWB, IEEE 802 including Ethernet, WiMAX, and/or others). The property assessment engine 220 may store the transmitted image data at an image database 234.

According to aspects, the property assessment engine 220 may analyze the image data stored at the image database 234 to generate virtual models of the overall region 201. To generate a virtual model, the property assessment engine 220, via a model generation module 137, may identify features or conditions of features of the property, such as dimensions (e.g., square footage, the height, etc.) and textual information (e.g., material of roof tiles, walls, visible damages, etc.) for the various features of the property within the overall region 201, and/or adapt the image data to appear on the appropriate dimension of each feature in the virtual model. The property assessment engine 220 may also adapt the image data in accordance with the feature condition rules described above when developing virtual models. Further, the property assessment engine 220 may link the virtual model with an annotations database 238 and/or external data source 270 that store records corresponding to the annotation object and/or data object, respectively, to integrate such objects into the virtual model. The property assessment engine 220 may then store the generated virtual model at a model database 236 for rendering in a virtual environment.

The client device 202 may access the virtual environment by sending, to the property assessment engine 220, a data request indicative of a particular portion of the overall region, such as a prospective property identifier corresponding to the pre-approved prospective property profile. The property assessment engine 220 may include a communication apparatus for providing, via the wireless communication network 216, the virtual environment to the client device 202. In some embodiments, the property assessment engine 220 may provide an instantiation of the virtual model to the client device 202 for the client device 202 to render in a virtual environment. Accordingly, a user accessing the client device 202 may view a rendering of the virtual model for one or more prospective properties to review features or conditions of features contained in the one or more prospective properties to evaluate any risk for the property.

Figure 3:
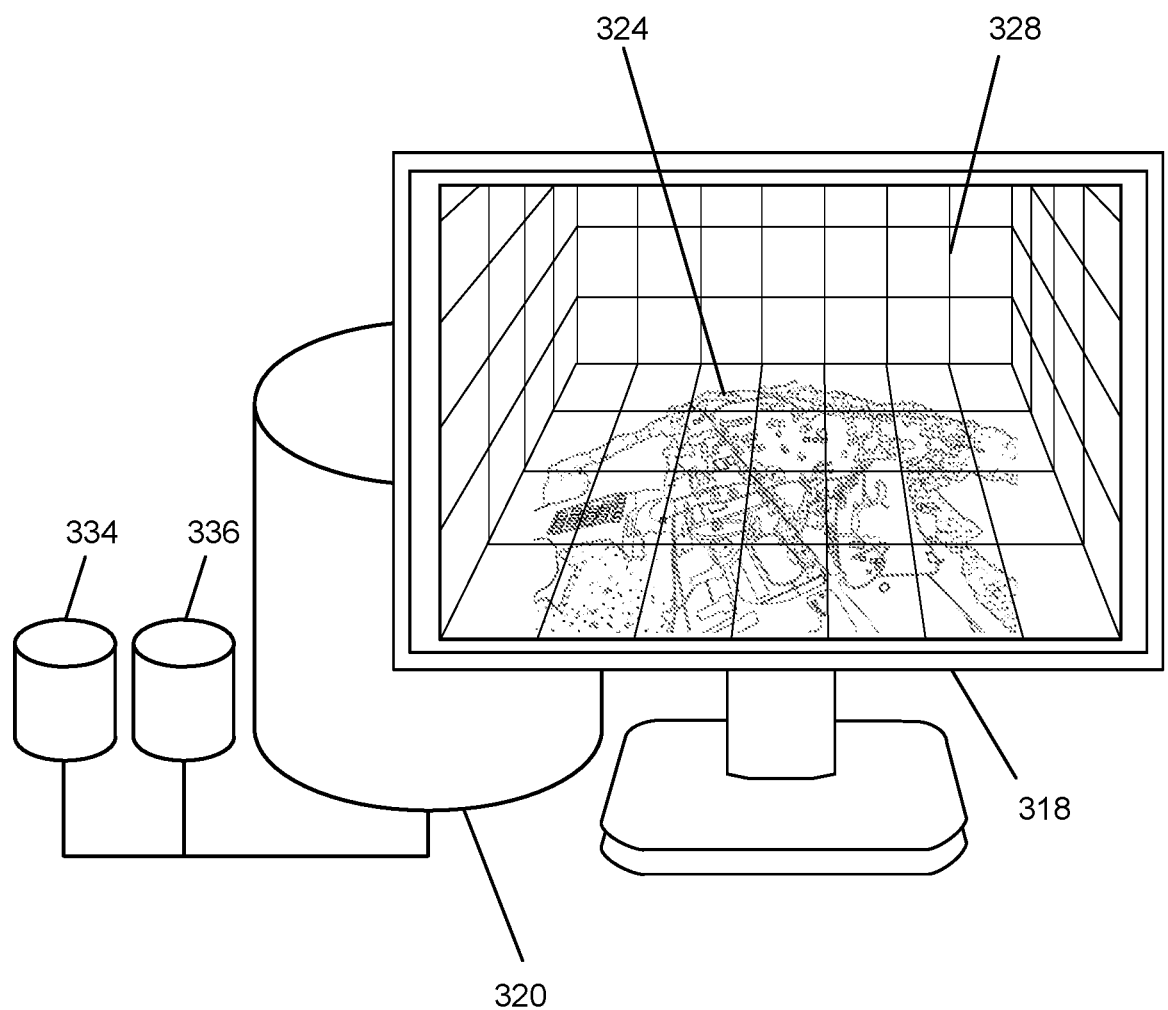
FIG. 3 depicts a rendering of a virtual environment that includes a virtual model of an overall region.

FIG. 3 depicts a rendering 324 of a virtual environment 328 that includes a virtual model of an overall region. In the illustrated embodiment, the rendering 324 is displayed on a display screen 318. To generate the rendering 324, a server 320 (such as the property assessment engine 220 of FIG. 2) accesses a model database 336 (such as the model database 236 of FIG. 2) to obtain virtual models of the overall region and/or the features of properties thereof. In some embodiments, the server 220 may also access an image database 234 (such as the image database 234 of FIG. 2) to obtain images relevant to user analysis. The server 320 may then generate the virtual environment 328 in which the virtual model of the overall region is rendered. Accordingly, a client device (such as the client device 202 of FIG. 2) communicative coupled to the server 320 may access the virtual environment 328. A user may then interact with the virtual environment 328 to view the renderings 324 from different angles and/or zoom levels.

Figure 4:
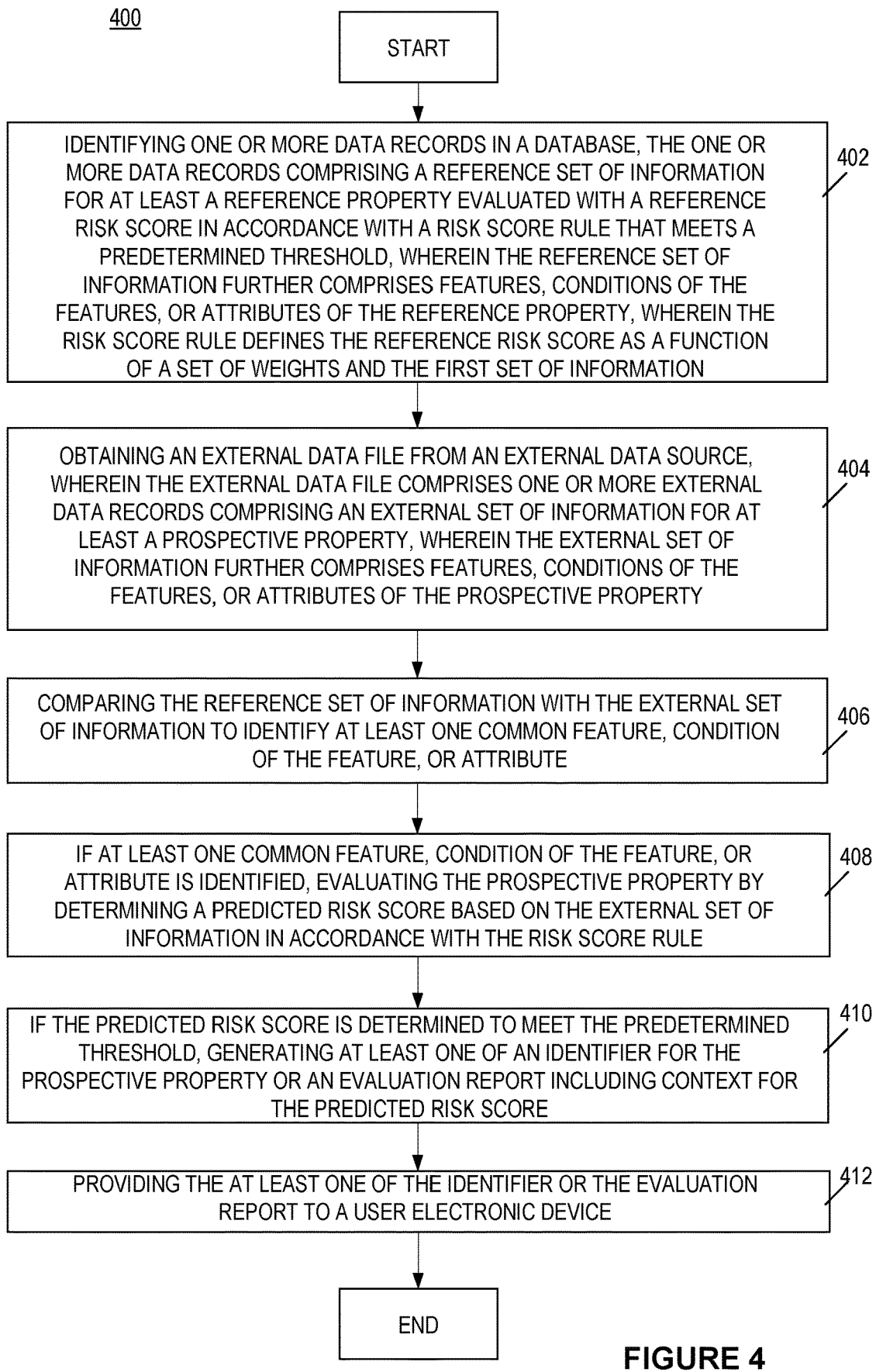
FIG. 4 depicts a flow chart of an example method for assessing a prospective property using external data associated with the prospective property.

FIG. 4 depicts a flow chart of an example method 400 for assessing a prospective property that has not yet been assessed of its risk, using external data associated with the prospective property received from an external source. The method may be executed by a server (such as the property assessment engine 120 of FIG. 1) in communication with a client device (such as the client device 102 of FIG. 1). The method 400 may begin when the server identifies one or more data records in a database (such as the client storage unit 180 of FIG. 1) (block 402). The one or more data records may include a reference set of information for at least a reference property evaluated with a reference risk score in accordance with a risk score rule that meets a predetermined threshold. The risk score rule defines the reference risk score as a function of a set of weights and the reference set of information. By meeting the predetermined threshold, the reference property may be evaluated as "low risk." The reference set of information may include features, conditions of the features, or attributes of the reference property. The reference set of information may be found in a reference property profile in storage unit 180 that describes characteristics of a qualified property that has already been designated with a "low risk" score. As an example, and using Eqn. 1 described above with respect to FIG. 1, a reference property that includes characteristics such as (1) more than 25 years old, (2) located in a low-crime area, (3) maintains a security system, and (4) has not been reported to have any roof damage may have a risk score of 0.325. Assuming a predetermined threshold of "0.4," the reference property may be qualified as a "low risk" property since the risk score of 0.25 is less than the predetermined threshold. By using the reference set of information for a qualified reference property having a "low risk" score as a criteria, the server may search for prospective properties having similar characteristics as those of the reference property.

To do so, at block 404, the server may obtain an external data file from an external data source (such as the external data source 170 of FIG. 1). The external data file may include one or more external data records comprising an external set of information for at least a prospective property that has not been evaluated with a risk score. Similar to the reference set, the external set of information may include features, conditions of the features, or attributes of the prospective property.

At block 406, the server may compare the reference set of information with the external set of information to identify at least one common feature, condition of the feature, or attribute, and if at least one common feature, condition of the feature, or attribute is identified, at block 408, the server may evaluate the prospective property by determining a predicted risk score based on the external set of information in accordance with the risk score rule. By way of example, upon comparison, the server may determine that the prospective property is more than 25 years old, located in the same area (e.g., block, neighborhood, city, zip code, etc.) as the reference property, and is associated with the same owner as the reference property having an actual risk score of 0.325 in accordance with the risk score rule described in Eqn. 1, as described above. In this example, it may be unknown whether the prospective property has been reported to have roof damage, and accordingly, it may be difficult to determine whether the prospective property should be assessed with the same risk score as the reference property that does not have a damaged roof. In such situations, the server may infer, based on various information, the likelihood that the prospective property may not have a damaged roof. For example, the server may be configured to recognize that a responsible owner of one property (e.g., reference property) is likely to be responsible for another property (e.g., the prospective property). As another example, the server may be configured to analyze the external data file to determine whether roof damage information is known for other properties similar to the prospective property based on a criteria (e.g., within a certain radius, age, owner, type of property, etc.). Accordingly, despite missing information, the server may still be able to determine a predicted risk score for the prospective property. For instance, if the analysis of the external data file suggests that the prospective property likely does not have a damaged roof, a numeric characteristic value of "1" may be used for "Characteristic value 4" of Eqn. 1, and therefore, the predicted risk score may be calculated as follows:

Predicted Risk Score=[(1)×(0.3)+(1)×(0.1)+(1)× (0.3)+(1)×(0.3)]/4=0.25.

As will be discussed below, if a visual depiction of the prospective property in a virtual environment reveals that in actuality, the prospective property appears to have severe roof damage, a numeric characteristic value of "3" may be used for "Characteristic value 4" of Eqn. 1, and therefore, the updated predicted risk score may be calculated as follows:

Updated Risk Score=[(1)×(0.3)+(1)×(0.1)+(1)×(0.3)+ (3)×(0.3)]/6=0.4, which may not meet a predetermined threshold of "0.4" as the updated risk score is not below the predetermined threshold.

At block 410, the server may generate an identifier, such as a property ID or other suitable identifier (e.g., hash of the address of the property) that uniquely identifies the prospective property as a pre-approved prospective property if the predicted risk score is determined to meet the predetermined threshold. Alternatively, or in addition, the server may generate an evaluation report including context for the predicted risk score. The evaluation report may identify characteristics of the property and explain how the characteristics contributed to the predicted numeric risk score. With the evaluation report, a user of the client device 102 may rank the qualified prospective properties or otherwise discern qualified prospective properties that barely were pre-approved, from qualified prospective properties that clearly stood out from the rest as stronger candidates for insuring, for example. As another example, the user may discern which characteristics of the prospective property particularly led to a high predicted risk score or a low predicted risk score.

At block 412, the server may subsequently provide the identifier and/or the evaluation report to a user electronic device (e.g., client device 102). With the identifier, a user of the client device 102 may evaluate promotional offerings for the prospective property. In some embodiments, a user may provide an assessment of the prospective property using the virtual environment if necessary without physically being present at the property. For instance, if the user notices that the prospective property has severe roof damage as described above, the user may provide feedback data via the client device 102 back to the server, which in turn may update the risk score. If the risk score exceeds the predetermined threshold, the server may notify the user that the prospective property is no longer pre-approved.

The assessment may be based on whether the user is capable of identifying the feature or condition of the feature as depicted in the virtual environment, as will be described further with respect to FIG. 5, or whether the server is capable of automatically identifying the feature or condition of the feature, as will be described further with respect to FIG. 6. As described above, the virtual model of the overall region may include conditions of external features (e.g., structures, roofs, walls, trees, fences) of a prospective property located within the overall region and rendered within the virtual environment that may assist the server or a user of the virtual environment in assessing the feature or condition of the one or more features. In some embodiments, the virtual models may further include annotations and/or other external data mapped to the features or conditions of features to further assist the server or the user when assessing the property when the virtual model is rendered in a virtual environment. Therefore, one or more annotation objects or data objects may be integrated into the virtual model.

For example, the server may obtain one or more annotation records and/or data records associated with the features or conditions of the features for the one or more prospective properties from an annotations database (such as the annotations database 238 of FIG. 2) and/or data records database (such as the external data source 270 of FIG. 2) that store the records corresponding to the annotation object and/or data object, respectively, as described above. Subsequently, the server may populate an annotations overlay and/or data records overlay rendered in the virtual environment with information included in the one or more annotation records and/or data records. Because records of annotation objects and/or data objects include interactive interface elements that specify how a feature or condition of the feature may be emphasized visually exist in the annotation records and/or data records, the visual overlays may be depicted in various ways, such as with various highlighting, coloring, textual shading, etc. Various ways of emphasizing features or conditions of features may be advantageous to differentiating certain conditions of features from others. For example, for annotations that emphasize conditions of features such as a newly installed roof, the annotation overlay may be displayed in a first color (e.g., green) or other first depiction characteristic (e.g., with a first outline of a certain shape, such as a circle), whereas for annotations that emphasize conditions of features such as a damaged roof, the annotation overlay may be displayed in a second color (e.g., red) or other second depiction characteristic (e.g., with a second outline of a certain shape, such as a square). This way, conditions of features that reduce risk (e.g., a newly installed roof) may be easily discerned from other conditions of features that increase risk (e.g., a damaged roof). Other ways of emphasizing conditions of features are envisioned, such as enlarging the condition of the feature or any suitable animation effect that serves to emphasize the condition of the feature.

Figure 5:
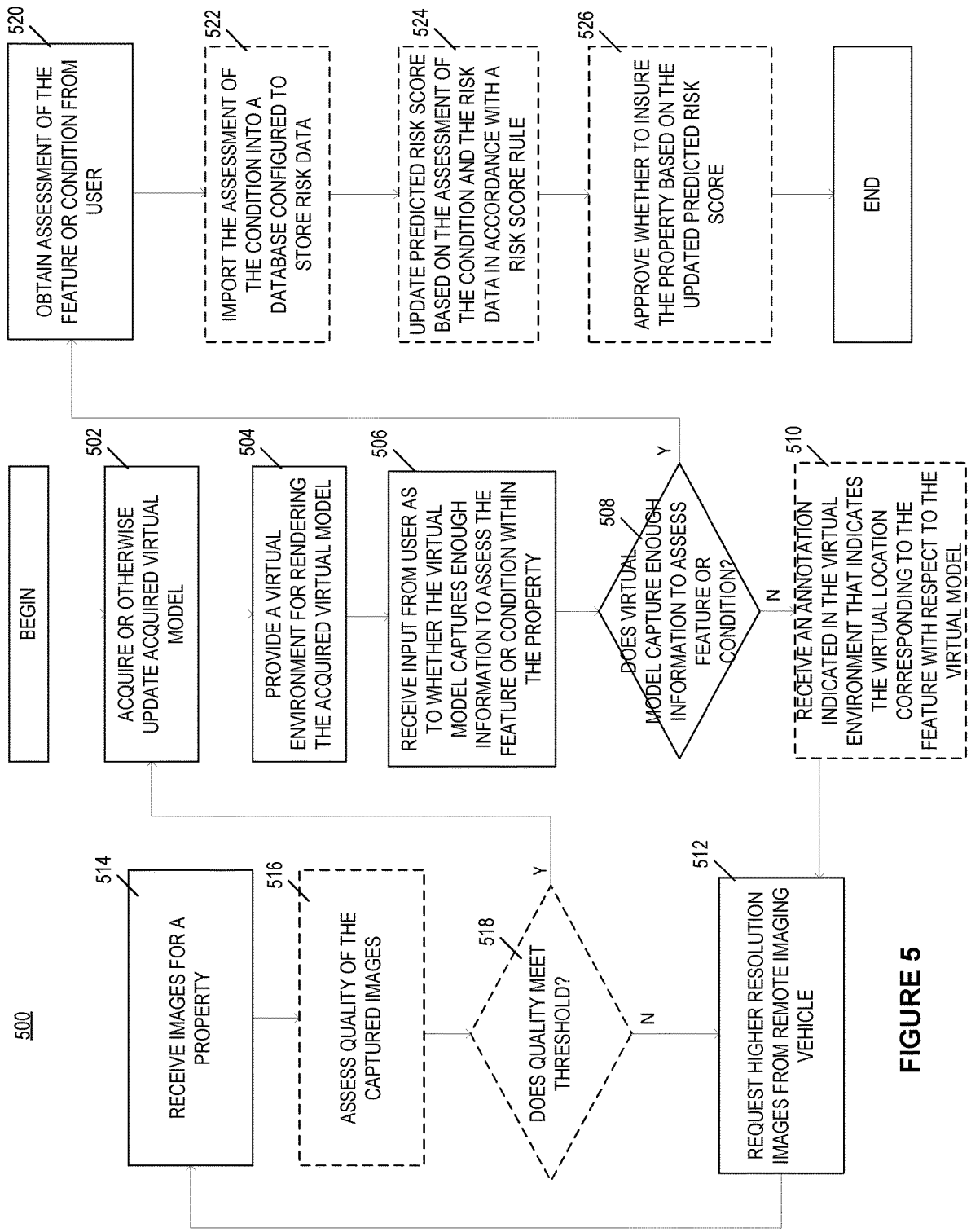
FIG. 5 depicts a flow chart of an example method for assessing features or conditions of features of a prospective property based on a representation of the features or conditions within a virtual environment.

FIG. 5 depicts a flow chart of an example method 500 for assessing features or conditions of features of a pre-approved prospective property based on a representation of the features or conditions within a virtual environment. The method may be executed by a server (such as the property assessment engine 120 of FIG. 1) in communication with a user electronic device (such as the client device 102 of FIG. 1). The method 500 may begin when the server acquires, from a model database (such as the model database 236 of FIG. 1), a virtual model for rendering the pre-approved prospective property within a virtual environment at the user electronic device (block 502).

At block 504, the server may provide a virtual environment to the user electronic device for rendering the acquired virtual model for the pre-approved prospective property. Alternatively, in some embodiments, the server may provide an instantiation of the acquired virtual model to the user electronic device for the user electronic device to render in a virtual environment.

At block 506, the server may receive an input from the user, via the user electronic device, as to whether the virtual model captures enough information to assess the feature or condition of a feature within the pre-approved prospective property. The user, via the user electronic device communicatively coupled to the server, may provide a state of the virtual environment within the user input back to the server. In this way, the user may be able to provide feedback to the server to indicate whether the virtual environment that depicts features or conditions of features of the pre-approved prospective property are clear enough to make an assessment.

At block 508, the server may parse the user input to determine whether the virtual model captures enough information to assess the feature or condition of a feature within the pre-approved prospective property. If the server determines that the virtual model does not capture enough information to assess the feature or the condition of a feature, the server may identify the portion of the virtual model that does not capture enough information to assess the feature or condition. To do so, the server may receive an annotation indicated in the virtual environment by the user that indicates the virtual location (e.g., virtual coordinates) corresponding to the feature with respect to the virtual model, as shown in block 510. In other embodiments, the server may omit the step of identifying the portion of the virtual model that does not capture enough information to assess the feature or condition if the server is configured to update the entire virtual model with newly acquired images for the overall region (e.g., overall region 201). Subsequently, the server may request higher resolution images from the remote imaging vehicle (e.g., remote imaging vehicle 240), as shown in block 512. The request may include a target image resolution and/or a particular location so that the imaging vehicle may capture imaging data indicating features or conditions of the one or more features according to the request. As shown in block 514, the server may receive the images from the remote imaging vehicle, and optionally assess (block 516) the image quality of the images to determine (block 518) whether the images meet the image resolution as indicated in the request. If the images meet the image resolution, the method 500 may proceed to block 502 to update the virtual model with the newly required images. Otherwise, if the images do not meet the image resolution, the method 500 may proceed to block 512 to request higher resolution images from the remote imaging vehicle.

On the other hand, after the server parses the user input to determine that the virtual model captures enough information to assess the feature or condition of a feature, the server may obtain the user's assessment of the feature or condition of the feature via the user electronic device, as shown in block 520. In some embodiments, the user may interact with the virtual environment to indicate the user's assessment. For example, selection of a feature or condition of a feature (e.g., via a mouse, touchscreen, etc.) may populate a textbox for user assessment input within the virtual environment, such that the virtual environment records or otherwise saves the assessment of the condition. In other embodiments, the user may, independent of the virtual environment, send, via the user electronic device, a message to the server indicative of the assessment.

In some embodiments, method 500 may proceed to block 522. At block 522, the server may import the assessment of the condition into a database (e.g., storage unit 180). In some embodiments, the assessment may be imported into the prospective property profile. Assessment feedback module 135 of the server may be configured to retrieve the assessment data and/or any other risk data stored in the database, and risk score prediction module 131 may update the predicted risk score based on the assessment of the feature or condition and/or the risk data in accordance with the risk score rule, as shown in block 524.

At block 526, the server may approve whether to insure the property based on the updated predicted risk score. Accordingly, the systems and methods described herein offer a benefit to service providers by identifying prospective properties to potentially insure. Moreover, by implementing the systems and methods, service providers may stand out as an effective insurance provider, thereby retaining existing customers and attracting new customers, for example.

Figure 6:
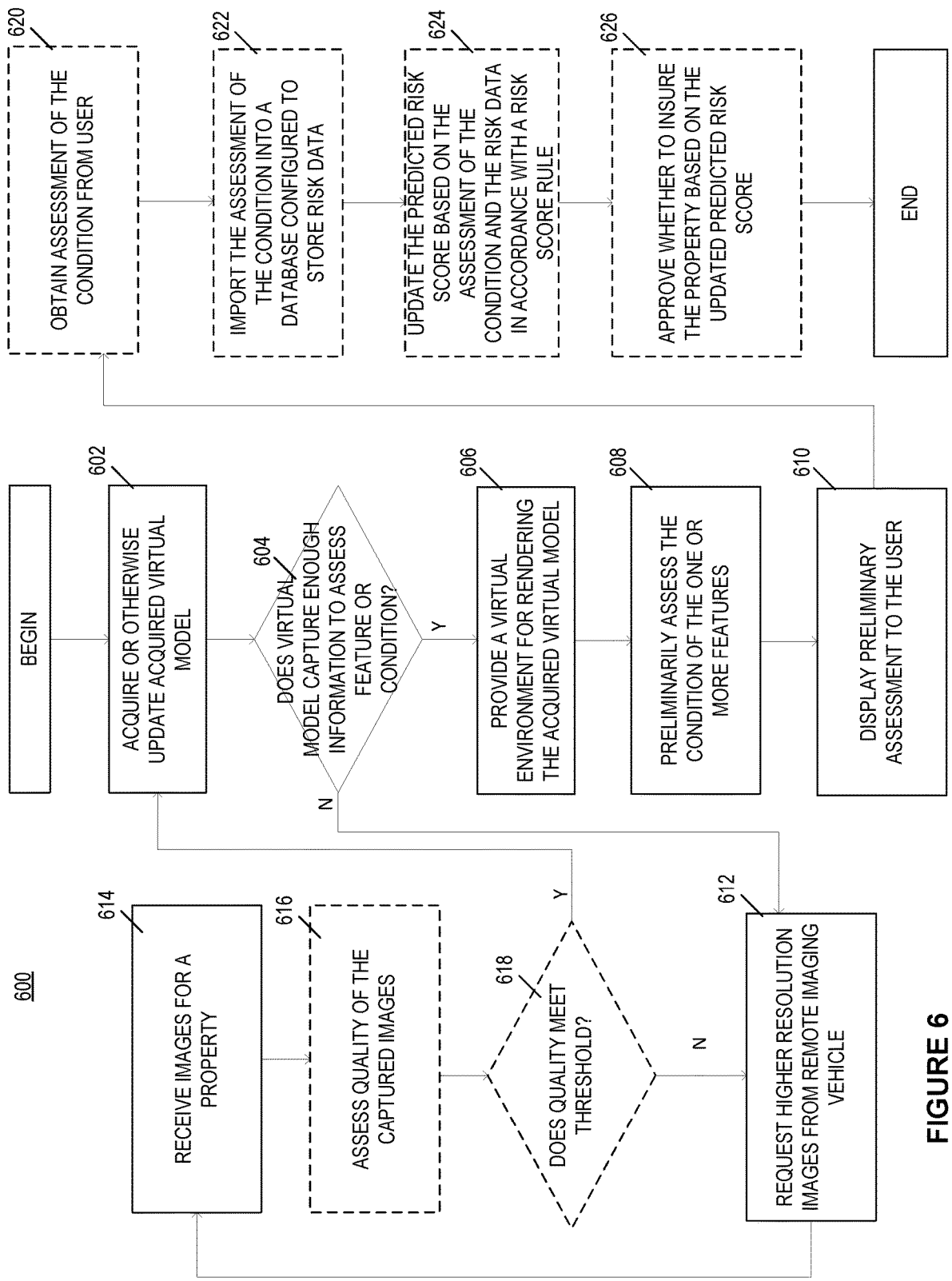
FIG. 6 depicts another flow chart of an example method for assessing features or conditions of features of a prospective property based on a representation of the features or conditions within a virtual environment.

FIG. 6 depicts a flow chart of another example method 600 for assessing features or conditions of features of a pre-approved prospective property based on a representation of the features or conditions within a virtual environment. The method may be executed by a server (such as the property assessment engine 220 of FIG. 1) in communication with a user electronic device (such as the client device 202 of FIG. 1). The method 600 may begin when the server acquires, from a model database (such as the model database 236 of FIG. 1), a virtual model for rendering the pre-approved prospective property within a virtual environment at the user electronic device (block 602).

At block 604, the server may assess the virtual model to determine whether the virtual model captures enough information to assess a feature or condition of a feature within the pre-approved prospective property. The server may be configured with feature condition rules that define a manner in which the model generation module executed by the server evaluates the image resolution of images used in the virtual model, and if the image resolution of images exceeds a particular threshold, automatically approves the virtual model. If the server determines that the virtual model does not capture enough information to assess the feature or condition of a feature, the server may proceed to update the virtual model with newly acquired images for the overall region (e.g., overall region 201). To do so, the server may request higher resolution images from the remote imaging vehicle (e.g., remote imaging vehicle 240), as shown in block 612. The request may include a target image resolution and/or a particular location of a particular condition of a feature so that the imaging vehicle may capture imaging data indicating conditions of the one or more features according to the request. As shown in block 614, the server may receive the images from the remote imaging vehicle, and optionally assess (block 616) the image quality of the images to determine (block 618) whether the images meet the image resolution as indicated in the request. If the images meet the image resolution, the method 600 may proceed to block 602 to update the virtual model with the newly required images. Otherwise, if the images do not meet the image resolution, the method 600 may proceed to block 612 to request higher-resolution images from the remote imaging vehicle.

On the other hand, after the server determines that the virtual model captures enough information to assess the feature or condition of a feature, the server may provide a virtual environment to the user electronic device for rendering the acquired virtual model for the pre-approved prospective property, as shown in block 606. Alternatively, in some embodiments, the server may provide an instantiation of the acquired virtual model to the user electronic device for the user electronic device to render in a virtual environment.

At block 608, the server may preliminarily assess the feature or condition of the feature depicted in the virtual environment. As mentioned above, the server may be configured with the feature condition rules that exhibit edge detection-based approaches or appearance-based approaches as known in the art to cause the server, via a model generation module, to compare templates data with the images corresponding to features or conditions of features to determine whether the edges or appearance of features or conditions of features detected in the images match the edges or appearances in the templates data according to a predetermined threshold. Upon determining a match, the server may display the preliminary assessment to the user via the virtual environment, as shown in block 610. For example, the preliminary assessment may be a visual overlay rendered in the virtual environment including a message, as will be further described with respect to FIG. 7 below.

In some embodiments, the method 600 may proceed to block 620. At block 620, the server may receive an input from the user, via the user electronic device, indicating a further assessment (i.e., a human assessment) of the feature or condition of the feature within the pre-approved prospective property. In other words, the user, via the remote user electronic device communicatively coupled to the server, may provide a state of the virtual environment back to the server. In this way, the user may be able to provide feedback to the server to confirm the preliminary assessment or modify the preliminary assessment, for example. In some embodiments, the user may interact with the virtual environment to indicate the user's assessment. For example, selection of a feature or condition of a feature (e.g., via a mouse, touchscreen, etc.) may populate a textbox for user assessment input, such that the virtual environment records or otherwise saves the assessment of the feature or condition. In other embodiments, the user may, independent of the virtual environment, send, via the user electronic device, a message to the server indicative of the assessment.

In some embodiments, method 600 may proceed to block 622. At block 622, the server may import the assessment of the feature or condition into a database (e.g., storage unit 180). In some embodiments, the assessment may be imported into the prospective property profile. Assessment feedback module 135 of the server may be configured to retrieve the assessment data and/or any other risk data stored in the database, and risk score prediction module 131 may update the predicted risk score based on the assessment of the feature or condition and/or the risk data in accordance with the risk score rule, as shown in block 624.

At block 626, the server may approve whether to insure the property based on the updated predicted risk score. Accordingly, the systems and methods described herein offer a benefit to service providers by identifying prospective properties to potentially insure. Moreover, by implementing the systems and methods, service providers may stand out as a effective insurance provider, thereby retaining existing customers and attracting new customers, for example. Accordingly, in contrast to the method 500 shown in FIG. 5, the method 600 may assist the user of the virtual environment by displaying preliminary assessments of various features or conditions of features identified in the virtual environment. For conditions that require further visual inspection by a user, the server may obtain additional human assessments from the user.

Figure 7:
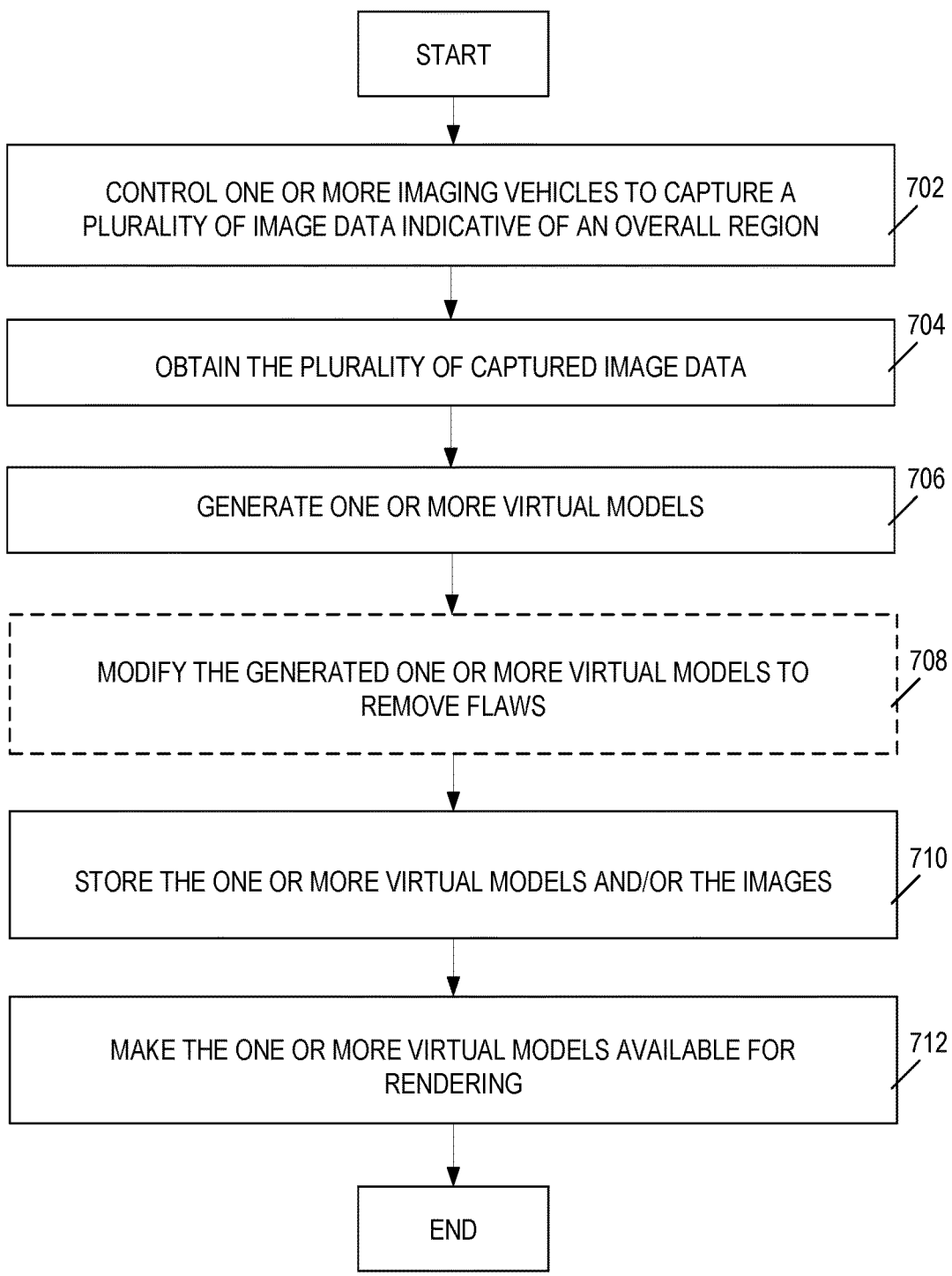
FIG. 7 depicts a flow chart of an example method for generating and developing virtual models.

FIG. 7 depicts a flow chart of an example method 700 for generating virtual models. A server, such as the server 220 of FIG. 2, may perform the method 700. The method 700 may begin when the server controls one or more imaging vehicles (such as the imaging vehicle 240 of FIG. 2) to capture a plurality of image data of an overall region including a prospective property (block 702). To control the imaging vehicle, the server may transmit commands directly or indirectly to the imaging vehicle. To this end, the server may format the commands in accordance with a control API of the imaging vehicle. For example, the API may enable the server to control the path of the imaging vehicle and/or any of the image capture characteristics.

As the imaging vehicle traverses the path, the imaging vehicle may capture a plurality of image data representative of the prospective property. The imaging vehicle may embed the captured data with metadata that indicates the location of the prospective property and/or features thereof. For example, the metadata may include physical coordinates of the imaging vehicle, an altitude of the imaging vehicle, pan/tilt/zoom data of the imaging apparatus, a speed of the imaging vehicle, and/or other data that enables the correlation of captured image data to physical coordinates.

The manner in which the imaging vehicle captures the image data may also be controlled by the server. In one example, the server may send a command to capture image data in a sweep mode in which the imaging apparatus of the imaging vehicle is configured to capture image data from a wide angle so as to capture image data of larger portions of the overall region. In another example, the server may send a command to capture image data representative of a target location to capture image data from a narrow angle so as to capture image data of focused portions of the overall region. In this example, the imaging vehicle may be configured to point the imaging apparatus at a particular location from a variety of different angles as the imaging vehicle traverses the path.

In some embodiments, the imaging vehicle stores the captured image data locally until the image vehicle returns to a dock or port. Once arriving at the dock or port, the captured image data may be either transferred via a wired or wireless network servicing the dock or port, or by extracting a physical storage device from the imaging vehicle and inserting the physical storage device into a computing device configured to store captured image data. In other embodiments, to reduce the storage requirements at the imaging vehicle, the imaging vehicle may transmit the image data to a centralized location as the imaging vehicle captures the image data. In any case, the image data captured by the imaging vehicle is stored at an image database (such as the image database 234 of FIG. 2) interconnected to the server.

The server may then obtain the stored image from the image database (block 704). In one example, the server may be configured to automatically detect when new image data is added to the image database. In response, the server may be configured to obtain and process the newly added image data. In another example, a user may execute a command that causes the server to obtain and process image data within the image database.

The server may then analyze and/or convert the obtained image data to generate a virtual model of the overall region and/or the various features thereof (block 706). To this end, the server may input the image data and the corresponding embedded metadata to a model generation module (such as the model generation module 137 of FIG. 1). The model generation module may apply photogrammetry techniques to identify edges, vertices, or surfaces of areas or structures of interest within the image data to segment the overall region into its various features. For example, the model generation module 137 may identify features across multiple images. Based on the known location and angle from which each image was captured, the model generation module 137 can utilize triangulation calculations to estimate three dimensional shapes of the feature. The model generation module 137 may then correlate each feature to physical coordinates and/or an address at which each feature is located in the prospective property. To generate a model, the model generation module 137 may analyze the image data to determine the dimensions of the modeled object and create a template three-dimensional object of the same dimensions. After the template object is generated, the model generation module 137 may generate a mesh for the object that utilizes the obtained image data. In embodiments in which the virtual model is developed to include integrated annotation objects and data objects, the model generation module 137 may also generate overlay meshes for the modeled object.

As is known in the art, for various reasons, virtual models are rarely generated without flaws. Sometimes, features will simply not be reconstructed in the virtual model, or reconstructed inaccurately. To this end, in some embodiments, after generating the virtual models, the server may then further develop the generated virtual models to remove flaws and/or otherwise "clean up" the virtual model (block 708). In some embodiments, the virtual model development process may even include removing features that have been reconstructed accurately but that are not relevant to assessing the prospective property. Virtual models may be developed using a variety of techniques. For instance, a particular scale or coordinate system may be modified, boundaries may be smoothed or deleted, gaps between objects may be bridged, parts of the model may be sliced and/or filled, density of meshes may be changed using triangulation, subdivision, and decimation techniques, etc. In some embodiments, a user may develop the virtual models using a graphical user interface associated with the model generation module 137 at the server.

The server may then store the generated virtual models in a model database, such as the model database 236 of FIG. 2 (block 710). The server may organize the virtual model database based on embedded metadata associated with the image data depicted in the virtual models. To this end, the server may determine that embedded location data for an updated virtual model generated based on the image data captured by the imaging vehicle includes the same or similar location information for a pre-existing virtual model already stored in the model database. Accordingly, the server may determine that the newly generated virtual model is an updated version of the currently stored virtual model.

By storing the virtual models in the model database, the server makes available the virtual models for use in rendering a virtual environment (block 712). According to aspects, the user electronic device may transmit a request to view a virtual environment that includes the modeled prospective property. In response, the server may query the model database and access any models that match the request. The server may then generate and provide the virtual environment including a rendered virtual model to the user electronic device. Further, as the virtual models are linked to the annotations database and/or data records database, as the data records and/or annotation records are updated over time, the updates may be automatically propagated into any overlays or informational displays included in the virtual environment.

Figure 8:
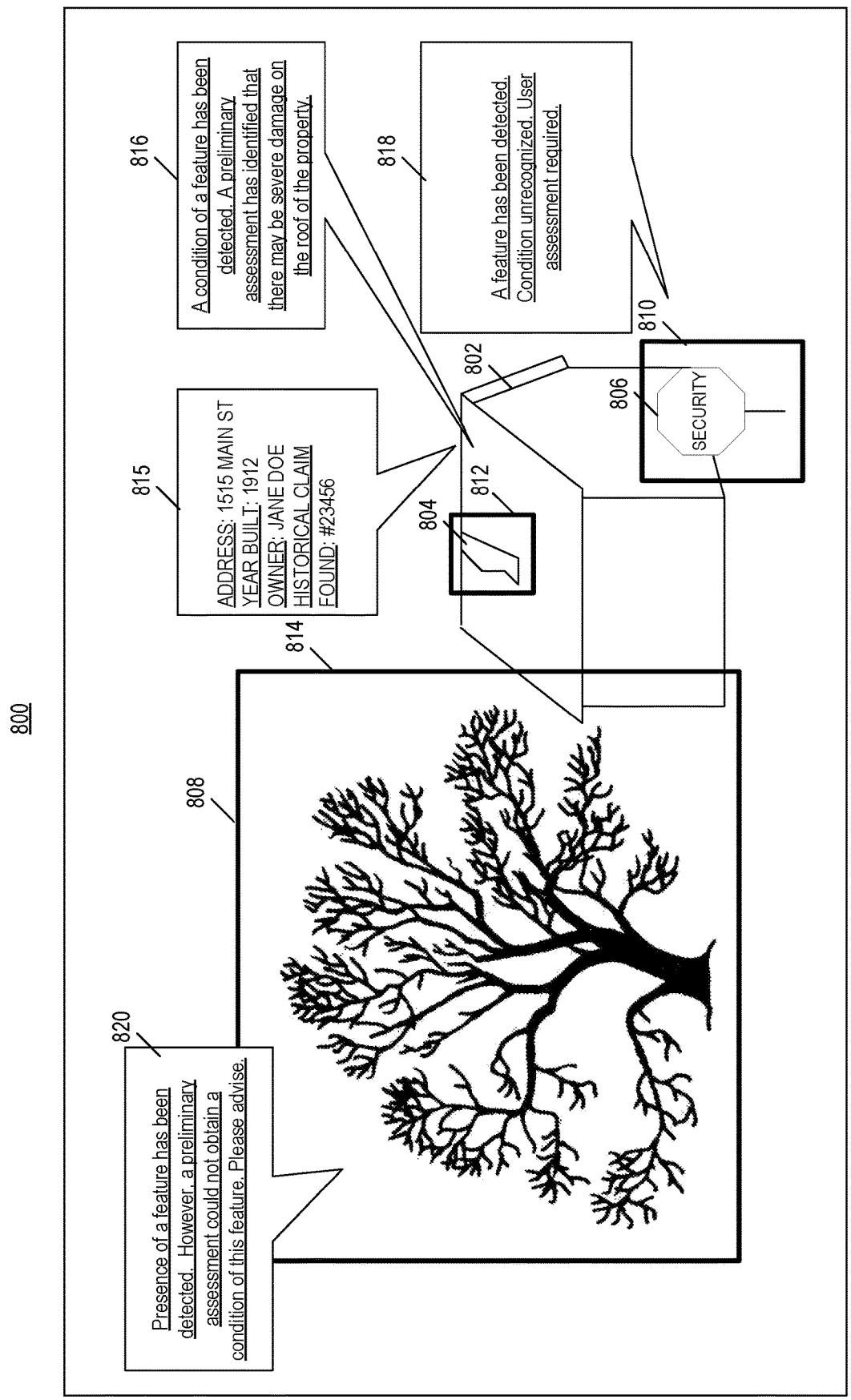
FIG. 8 depicts an exemplary virtual environment that includes virtual models of one or more prospective properties with an exemplary assessment rendered therein.

FIG. 8 depicts a virtual environment 800 in which overlays are rendered therein. For instance, a virtual model of a prospective property may, upon render, depict various features and conditions thereof of the property, including a structure 802 of a building (e.g., a home), a crack 804 in a roof, a security sign 806 indicating that a security system has been installed, and a leaning tree 808.

As shown, exemplary assessments may be rendered in the virtual environment 800. An example of a user assessment obtained by the server in block 520 of FIG. 5 may be assessment 818. Assessment 818 may indicate that a feature (e.g., security sign 806) has been detected, but that the condition of the feature could not have been automatically assessed by the server. A user may view the representation of the condition in the virtual environment and accordingly communicate the human assessment to the server via the user electronic device. As another example, a user assessment obtained by the server in block 620 of FIG. 6 may be assessment 816. Assessment 816 may indicate that a condition of a feature (e.g., crack 804 in a roof) has been automatically preliminarily assessed by the server. A user may view the representation of the condition in the virtual environment, confirm or modify the preliminary assessment, and accordingly communicate the human assessment to the server via the user electronic device. As another example, an assessment such as assessment 820 may be displayed in the virtual environment. Assessment 820 may indicate that the presence of a feature (e.g., tree 808) has been automatically detected, but that a preliminary assessment of the condition of the tree (whether the tree 808 is leaning towards the property 802) cannot be made by the server. A user may view the representation of the condition in the virtual environment, provide the human assessment, and accordingly communicate the human assessment to the server via the user electronic device.

In some embodiments, exemplary annotation overlays may be rendered in the virtual environment 800. A user using the virtual environment 800 may desire to emphasize that the condition of property 802 includes a security sign 806 feature that is lowering risk for the property as it is deterring future theft or burglary for the property, whereas the damaged condition of the roof 804 and leaning condition of the tree 808 features are increasing risk for the property, since the cracked roof 804 and leaning tree 808 may invite further damage to the property 802. Accordingly, the user may interact (e.g., invoke hand gestures, and/or utilize a control device) with any of the features (e.g., the security sign 806) within the virtual environment 800 to cause an annotation overlay 810 to surround security sign 806 to emphasize the security sign 806. Because the security sign 806 may be a source for reducing the risk of theft or burglary at the property by deterring future theft or burglary at the property, the annotation overlay 810 may be visually distinguished from annotation overlay 812 for example, which may surround the roof crack 804 to emphasize the high level of risk associated with the property. For instance, the annotation overlay 810 may be visually depicted in a green color, and the annotation overlay 812 may be visually depicted in a red color. As another example, annotation overlay 814 may surround the leaning tree 808 in a similar way as annotation overlay 812 to emphasize that the leaning tree 808 may be a source of a high level of risk associated with the property.

In some embodiments, a user may interact with the virtual environment 800 to cause data records overlays to be rendered within the virtual environment. For example, data records overlays may include external data such as the age, an address, a market value, a name of business, a name of owner, agent affiliation, zoning information, current or historical building permits, assessed tax value, or historical claims data associated with the one or more prospective properties. As shown, exemplary data records overlay 816 may be rendered in the virtual environment. Data records overlay 815 may indicate various information concerning the modeled property, such as address, year built, and/or owner of the property. In some aspects, a server may have linked a data record to the virtual model. The data records overlay 815 may therefore include records information included in the data record associated with the prospective property, such as any public records or proprietary records found for the property.

It should be noted that while FIG. 8 illustrates the virtual model of a residential home, other virtual models may be representative of other types of property (e.g., residential building, neighborhood, or other suitable region surrounding a property).

ADDITIONAL CONSIDERATIONS

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims. The systems and methods described herein are directed to an improvement to computer functionality, and improve the functioning of conventional computers.

What is claimed is:

1. A computer-implemented method comprising:
    transmitting, by one or more processors and to an imaging vehicle, a command, in accordance with an Application Programming Interface (API) of the imaging vehicle;
    capturing, by the one or more processors and via the command and the API, a plurality of images of a prospective property, wherein the command comprises GPS coordinates corresponding to a location of the prospective property;
    receiving, by the one or more processors and from the imaging vehicle, the plurality of images associated with the location of the prospective property;
    identifying, by the one or more processors, one or more data records in a database, the one or more data records comprising a reference set of information for at least a reference property, wherein the reference set of information comprises characteristics of the reference property, and the characteristics comprise one or more of features, conditions of the features, or attributes;
    determining, by the one or more processors, that a reference risk score of the reference property is less than a threshold associated with a risk score rule,
    obtaining, by the one or more processors, a data file from a data source, wherein the data file comprises one or more data records comprising a set of information for at least the prospective property;
    comparing, by the one or more processors and based on the risk score rule, the reference set of information;
    determining, by the one or more processors, a first risk score, based on the set of information and at least one characteristic in common, in accordance with the risk score rule;
    determining, by the one or more processors, that the first risk score is less than the threshold;
    determining, by the one or more processors, a pre-approved status of the prospective property based on determining the first risk score is less than the threshold;
    generating, by the one or more processors, an identifier;
    generating, by the one or more processors, an evaluation report including context for the first risk score and the weights associated with the characteristics of the prospective property;
    generating, by the one or more processors and using the plurality of images, a virtual environment including a model of the prospective property;
    generating, by the one or more processors, a visual overlay associated with the model, the visual overlay including a representation of the evaluation report, the evaluation report including the characteristics of the prospective property associated with the context for the first risk score;

combining, by the one or more processors, the model and the visual overlay; and displaying, by the one or more processors, the identifier on the combined model and visual overlay in the virtual environment.

2. The computer-implemented method of claim 1, further comprising:

determining, by the one or more processors, to assess the prospective property in the virtual environment in accordance with feature condition rules;

determining, by the one or more processors, that a portion of the plurality of images meets or exceeds an image resolution threshold;

identifying, by the one or more processors and from a model database, templates data including templates of model edge or appearance characteristics of the features, conditions of features, or attributes;

comparing, by the one or more processors, edge or appearance characteristics in the portion of the plurality of images with the templates data;

generating, by the one or more processors, image data based at least in part on identifying at least an image of the portion of the plurality of images includes the edge or appearance characteristics; and storing, by the one or more processors and in the model database, the generated image data.

3. The computer-implemented method of claim 2, further comprising:

determining, by the one or more processors, to assess the characteristics of the prospective property in the virtual environment in accordance with the feature condition rules, wherein the characteristics are relevant to assessing risks associated with the prospective property; and obtaining, by the one or more processors, an assessment of the characteristics of the prospective property within the virtual environment.

4. The computer-implemented method of claim 3, further comprising:

importing, by the one or more processors, risk data into the database, the risk data including the obtained assessment of the characteristics of the prospective property; and determining, by the one or more processors, a second risk score based on the characteristics of the prospective property and the risk data in accordance with the risk score rule.

5. The computer-implemented method of claim 4, further comprising:

based at least in part on determining the second risk score meets the threshold, storing, by the one or more processors, the identifier for the prospective property.

6. The computer-implemented method of claim 4, further comprising:

based at least in part on determining the second risk score is below the threshold, storing, by the one or more processors, the identifier for the prospective property.

7. The computer-implemented method of claim 3, further comprising:

receiving, by the one or more processors, user input to assess a feature of the prospective property based on a second portion of the plurality of images associated with the feature; and determining, by the one or more processors, that the second portion of the plurality of images meets or exceeds the image resolution threshold.

8. The computer-implemented method of claim 7, further comprising:

defining, by the one or more processors, the templates data including the templates of model edge or appearance characteristics of features, conditions of features, or attributes relevant to assessing risk; and assessing, by the one or more processors, the feature of the prospective property by comparing the edge or appearance characteristics in the plurality of images with the templates data.

9. The computer-implemented method of claim 2, further comprising:

determining, by the one or more processors, that a second portion of the plurality of images fails to meet or exceed the image resolution threshold;

providing, by the one or more processors, an image capture request to the imaging vehicle;

updating, by the one or more processors and using the additional images, the model in the virtual environment, the updated model comprising a three-dimensional virtual model of the prospective property in the virtual environment.

10. A system, comprising:

one or more processors;

one or more transceivers, operatively connected to the one or more processors, to send and receive communications over one or more communication networks; and one or more non-transitory memories coupled to the one or more processors and storing computer-executable instructions, that, when executed by the one or more processors, cause the one or more processors to perform steps of:

transmitting, to an imaging vehicle, a command, in accordance with an Application Programming Interface (API) of the imaging vehicle;

capturing, via the command and the API, a plurality of images prospective property, wherein the command comprises GPS coordinates corresponding to a location of the prospective property;

receiving, from the imaging vehicle, the plurality of images associated with the location of the prospective property;

identifying one or more data records in a database, the one ore data records comprising a reference set of information for at least a reference property, wherein the reference set of information comprises characteristics of the reference property, wherein the characteristics comprise one or more of features, conditions of the features, or attributes;

determining that a reference risk score of the reference property is less than a threshold associated with a risk score rule;

obtaining a data file from a data source, wherein the data file comprises one or more data records comprising a set of information for at least the prospective property;

comparing, based on the risk score rule, the reference set of information;

determining a first risk score, based on the set of information and at least one characteristic in common, in accordance with the risk score rule;

determining that the first risk score is less than the threshold;

determining a pre-approved status of the prospective property based on determining the first risk score is less than the threshold;
generating an identifier;
generating an evaluation report including context for the first risk score and weights associated with the characteristics of the prospective property;
generating, by using the plurality of images, a virtual environment including a model of the prospective property;
generating a visual overlay associated with the model, the visual overlay including a representation of the evaluation report, the evaluation report including the characteristics of the prospective property associated with the context for the first risk score;
combining the model and the visual overlay; and
displaying the identifier on the combined model and visual overlay in the virtual environment.

11. The system of claim 10, wherein the model is generated based upon the plurality of images associated with the location of the prospective property.

12. The system of claim 11, wherein the one or more data records correspond to visual representations of the characteristics of the prospective property in the virtual environment.

13. The system of claim 11, wherein the instructions, when executed by the one or more processors, further cause the one or more processors to perform the steps of:
determining to assess the characteristics of the prospective property in the virtual environment in accordance with feature condition rules, wherein the characteristics are relevant to assessing risk associated with the prospective property; and
obtaining an assessment of the characteristics based on the characteristics within the virtual environment.

14. The system of claim 13, wherein the instructions, when executed by the one or more processors, further cause the one or more processors to perform the steps of:
importing risk data into the database, the risk data including the obtained assessment; and
determining a second risk score based on the characteristics of the prospective property in the virtual environment and the risk data in accordance with the risk score rule.

15. The system of claim 14, wherein the instructions, when executed by the one or more processors, further cause the one or more processors to perform the steps of:
based at least in part on determining the second risk score meets the threshold, storing the identifier for the prospective property.

16. The system of claim 14, wherein the instructions, when executed by the one or more processors, further cause the one or more processors to perform the steps of:
based at least in part on determining the second risk score is below the threshold, storing the identifier for the prospective property.

17. The system of claim 13, wherein the instructions, when executed by the one or more processors, further cause the one or more processors to perform the steps of:
assessing the characteristics of the prospective property if the plurality of images captured by the imaging vehicle meets or exceeds an image resolution threshold.

18. A non-transitory, tangible computer-readable medium storing machine readable instructions that, when executed by a processor, cause the processor to perform steps of:
transmitting, to an imaging vehicle, a command, in accordance with an Application Programming Interface (API) of the imaging vehicle;
capturing, via the command and the API, a plurality of images of a prospective property, wherein the command comprises GPS coordinates corresponding to a location of the prospective property;
receiving, from the imaging vehicle, the plurality of images associated with the location of the prospective property;
identifying one or more data records in a database, the one or more data records comprising a reference set of information for at least a reference property, wherein the reference set of information comprises characteristics of the reference property, wherein the characteristics comprise one or more of features, conditions of the features, or attributes;
determining that a reference risk score of the reference property is less than a threshold associated with a risk score rule;
obtaining a data file from a data source, wherein the data file comprises one or more data records comprising a set of information for at least the prospective property;
compare, based on the risk score rule, the reference set of information;
determining a first risk score, based on the set of information and at least one characteristic in common, in accordance with the risk score rule;
determining that the first risk score is less than the threshold;
determining a pre-approved status of the prospective property based on determining the first risk score is less than the threshold;
generating an identifier;
generating an evaluation report including context for the first risk score and weights associated with the characteristics of the prospective property;
generating, by using the plurality of images, a virtual environment including a model of the prospective property;
generating a visual overlay associated with the model, the visual overlay including a representation of the evaluation report, the evaluation report including the characteristics of the prospective property associated with the context for the first risk score;
combining the model and the visual overlay; and
displaying the identifier on the combined model and visual overlay in the virtual environment.

19. The non-transitory, tangible computer-readable medium of claim 18, wherein the model is generated based upon the plurality of images associated with the location of the prospective property and the instructions, when executed by the processor, further cause the processor to perform steps of:
determining a portion of the plurality of images fails to meet an image resolution threshold, the portion of the plurality of images is associated with a feature of the prospective property;
transmitting, to the imaging vehicle, a second command to capture additional images associated with the location of the prospective property, the command including the GPS coordinates corresponding to the location of the prospective property, the feature of the prospective property, and an image resolution;
replacing, by the one or more processors, the portion of the plurality of images with the additional images; and updating, by the one or more processors, the model in the virtual environment.

\* \* \* \* \*